(12) United States Patent
Nett

(10) Patent No.: US 12,554,995 B2
(45) Date of Patent: Feb. 17, 2026

(54) COMPUTATIONALLY EFFICIENT FRAMEWORK FOR SEQUENCE-TO-SEQUENCE MODELING AND REINFORCEMENT LEARNING WITH DEEP HISTORY

(71) Applicant: First Principles AI, Inc., Auburn, WA (US)

(72) Inventor: Jason Michael Nett, Auburn, WA (US)

(73) Assignee: First Principles AI, Inc., Auburn, WA (US)

( * ) Notice: Subject to any disclaimer, the term of this patent is extended or adjusted under 35 U.S.C. 154(b) by 0 days.

(21) Appl. No.: 19/257,909

(22) Filed: Jul. 2, 2025

(65) Prior Publication Data
US 2026/0010802 A1    Jan. 8, 2026

Related U.S. Application Data

(60) Provisional application No. 63/836,810, filed on Jul. 1, 2025, provisional application No. 63/667,076, filed on Jul. 2, 2024.

(51) Int. Cl.
*G06N 5/01* (2023.01)
(52) U.S. Cl.
CPC ..................... *G06N 5/01* (2023.01)
(58) Field of Classification Search
CPC .......... G06N 3/045; G06N 3/08; G06N 20/00; G06N 3/084; G06N 3/04; G06N 20/20; G06N 3/044; G06N 3/0464; G06N 3/048; G06N 3/047; G06N 7/01; G06N 5/01; G06N 20/10; G06N 3/088; G06N 3/0455; G06N 5/022; G06N 3/082; G06N 3/09; G06N 5/04; G06N 3/006; G06N 5/02;
(Continued)

(56) References Cited

U.S. PATENT DOCUMENTS

2018/0095950 A1* 4/2018 Phadke ................. G06F 40/205
2018/0173689 A1   6/2018 Pino et al.
(Continued)

OTHER PUBLICATIONS

"Introduction to graph theory: Trees" Bhaskar Sharma URL: https://dev.to/capnspek/introduction-to-graph-theory-trees-4j8g#:~:text=Properties%20of%20Trees:,the%20bottom%20of%20the%20tree. (Year: 2023).*
Papineni et al., "BLEU: A Method for Automatic Evaluation of Machine Translation," Proceedings of the 40th Annual Meeting of the Association for Computational Linguistics, Jul. 2002, 8 pages.
Van den Oord et al., "Neural Discrete Representation Learning," Advances in Neural Information Processing Systems, 2017, 10 pages.

(Continued)

*Primary Examiner* — Luis A Sitiriche
(74) *Attorney, Agent, or Firm* — Fish & Richardson P.C.

(57) ABSTRACT

Methods, systems, and apparatus, including computer programs encoded on a computer storage medium, for training and utilizing a tree-based machine learning model to perform sequence modeling tasks. In one aspect, a method comprises: obtaining a collection of training examples, wherein each training example comprises a sequence of data elements; using the collection of training examples to train a tree model that includes a plurality of paths of connected nodes that each represent a respective sequence of data elements from the collection of training examples by associating each path in the tree model that represents a sequence of data elements with a count feature that represents a number of times the sequences of data elements occurs in the collection of training examples; and performing a sequence modeling task or an agent control task using the trained tree model.

20 Claims, 8 Drawing Sheets

(58) Field of Classification Search
CPC ........ G06N 3/063; G06N 3/02; G06N 3/0442; G06N 3/0475; G06N 3/0895; G06N 3/092; G06N 3/094; G06N 3/096; G06N 5/025; G06N 3/042; G06N 3/0985; G06N 5/046; G06N 3/0499; G06N 5/045; G06N 3/123; G06N 3/043; G06N 3/086; G06N 3/105; G06N 5/041; G06N 3/00; G06N 3/049; G06N 3/098; G06N 3/0418; G06N 3/0495; G06N 5/047; G06N 7/00; G06N 7/023; G06N 3/002; G06N 3/008; G06N 3/061; G06N 3/091; G06N 3/126; G06N 99/00; G06N 10/20; G06N 10/60; G06N 3/065; G06N 5/027

See application file for complete search history.

(56) References Cited

U.S. PATENT DOCUMENTS

| | | | |
|---|---|---|---|
| 2020/0311559 A1* | 10/2020 | Chattopadhyay | ........ G06N 5/01 |
| 2022/0207612 A1* | 6/2022 | Li | ....................... G06F 16/2455 |

OTHER PUBLICATIONS

Vaswani et al., "Attention Is All You Need," 31st Conference on Neural Information Processing Systems, Aug. 2, 2023, 15 pages.

Webber, "A Programmatic Introduction to Neo4j," SPLASH '12: Proceedings of the 3rd Annual Conference on Systems, Programming, and Applications: Software for Humanity, pp. 217-218 (abstract only).

Dodla et al., "HEARTS: Multi-task Fusion of Dense Retrieval and Non-autoregressive Generation for Sponsored Search," CoRR, Submitted on Sep. 13, 2022, arXiv:2209.05861v1, 9 pages.

Ermanno Pibiri et al., "Handling Massive N-Gram Datasets Efficiently," ACM Transactions on Information Systems, Association for Computing Machinery, Feb. 11, 2019, 37(2): 1-41.

Germann et al., "Tightly Packed Tries: How to Fit Large Models into Memory, and Make them Load Fast, Too," Software Engineering, Testing, and Quality Assurance for Natural Language Processing, Association for Computational Linguistics, Jun. 5, 2009, pages.

International Search Report and Written Opinion in International Appln. No. PCT/US2025/036288, mailed on Oct. 15, 2025, 18 pages.

* cited by examiner

|  | Described Methods | Transformer (1 Epoch) | Transformer (30 Epochs) |
|---|---|---|---|
| Dataset Preprocessing Time | 241.9 s (~4 mins) | N/A | N/A |
| Model Training Time | 63.7 s | 6781 s (~1.9 hrs) | 205892 s (57.2 hrs) |
| Number of Parameters | 5,052,148 | 19,975,576 | 19,975,576 |
| Vocabulary Size | 126,457 | 15,000 | 15,000 |
| Avg. Bleu Score on Training Data | 0.96 | 0.00003 | 0.0002 |
| Avg. Bleu Score on Validation Data | 0.29 | 0.002 | 0.008 |

FIG. 8

COMPUTATIONALLY EFFICIENT FRAMEWORK FOR SEQUENCE-TO-SEQUENCE MODELING AND REINFORCEMENT LEARNING WITH DEEP HISTORY

CROSS-REFERENCE TO RELATED APPLICATIONS

This application claims priority to U.S. Provisional Application No. 63/667,076, filed on Jul. 2, 2024, and U.S. Provisional Application No. 63/836,810, filed on Jul. 1, 2025. The disclosures of the prior applications are considered part of and are incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can train and utilize a tree-based machine learning model to perform sequence modeling tasks.

According to a first aspect there is provided a method performed by one or more computers that includes: obtaining a collection of training examples, wherein each training example includes a sequence of data elements; training a tree model on the collection of training examples, wherein: (i) the tree model includes a set of nodes and a set of edges, wherein each node is associated with a respective data element, and wherein each edge connects a respective pair of nodes, (ii) the tree model includes a plurality of paths from a root node of the tree model to a leaf node of the tree model that each represent a respective sequence of data elements from the set of training examples, and (iii) training the tree model includes associating each path in the tree model that represents a sequence of data elements with a count feature that represents a number of times the sequences of data elements occurs in the collection of training examples; and performing a sequence modeling task or an agent control task using the trained tree model.

After training the tree model, the described systems can perform a sequence modeling task by receiving an input sequence of data elements for the sequence modeling task and processing the input sequence of data elements to generate an output sequence of data elements for the sequence modeling task. In particular, the described systems can process the input sequence to identify and generate an output sequence that is most probably associated with the input sequence as determined using the trained tree model.

For example, the described systems can process an input sequence of data elements for a sequence modeling task to generate an output sequence of data elements for the sequence modeling task by initializing a current sequence of data elements as the input sequence of data elements and iteratively extending the current sequence of data elements over a plurality of iterations, by, at each of one or more iterations: (i) executing a query on the tree model to determine a score distribution over a set of possible data elements, wherein the score for each target data element is based on a count feature for a path in the tree model that represents a sequence of data elements that extends the current sequence of data elements by the target data element; and (ii) selecting one or more data elements to extend the current sequence of data elements based on the score distribution.

In some implementations, the tree model explicitly represents the sequence of data elements from every training example in the set of training examples.

In some implementations, training the tree model on the set of training examples comprises, for one or more training examples: determining that a path representing the sequence of data elements of the training example currently exists in the tree model; and in response, incrementing the count feature associated with the path representing the sequence of data elements of the training example.

In some implementations, training the tree model on the set of training examples comprises, for one or more training examples: determining that a path representing a prefix of the sequence of data elements of the training example currently exists in the tree model; and in response, branching the path representing the prefix of the sequence of data elements to represent a suffix of the sequence of data elements of the training example.

In some implementations, training the tree model on the set of training examples comprises, for one or more training examples: determining that no path in the tree model represents any prefix of the sequence of data elements of the training example; and in response, adding a new path comprising a sequence of nodes and edges to the tree model to represent the sequence of data elements of the training example.

In some implementations, the training of the tree model is performed substantially in parallel by a plurality of independent computing units.

In some implementations, training the tree model substantially in parallel by the plurality of computing units comprises: distributing the training examples from the set of training examples across the plurality of independent computing units; wherein each computing unit independently updates the tree model based on each training example in a set of training examples that are assigned to the computing unit.

In some implementations, training the tree model on the set of training examples further comprises: associating each path in the tree model that represents a sequence of data elements with one or more metadata features, wherein each metadata feature comprises metadata for an instance of the sequence of data elements in the set of training examples.

In some implementations, obtaining the set of training examples comprises preprocessing the set of training example, including, for each training example: identifying a plurality of subsequences of data elements from the sequence of data elements of the training example; and augmenting the set of training examples to include new training examples corresponding to the plurality of subsequences of data elements.

In some implementations, identifying the plurality of subsequences of data elements from the sequence of data elements comprises identifying all subsequences having a length that is between a predefined minimum and maximum length.

In some implementations, wherein the set of training examples comprises at least 100,000 training examples.

In some implementations, the tree model occupies less than 1% of memory space that is required to represent the set of training examples as a Markovian transition tensor.

In some implementations, the trained tree model is used to perform a sequence modeling task; and the sequence modeling task comprises: receiving an input sequence of data elements; and processing the input sequence of data elements to generate an output sequence of data elements.

In some implementations, processing the input sequence of data elements to generate the output sequence of data elements comprises: initializing a current sequence of data elements as the input sequence of data elements; iteratively extending the current sequence of data elements over a plurality of iterations, comprising, at each of one or more iterations: executing a query on the tree model to determine a score distribution over a set of possible data elements, wherein the score for each target data element is based on a count feature for a path in the tree model that represents a sequence of data elements that extends the current sequence of data elements by the target data element; and selecting one or more data elements to extend the current sequence of data elements based on the score distribution.

In some implementations, iteratively extending the current sequence of data elements over the plurality of iterations further comprises, at each of one or more iterations: executing a query on the tree model to determine that the tree model does not include any paths that extend the current sequence of data elements; and in response, identifying a plurality of subsequence combinations of the current sequence of data elements, wherein each subsequence combination defines a partition of the current sequence of data elements into a plurality of contiguous subsequences of data elements; executing queries on the tree model to generate, for each of the plurality of subsequence combinations, a respective candidate extension of the current sequence of data elements; executing queries on the tree model to determine a probability of each candidate extension of the current sequence of data elements; and selecting one or more of the candidate extensions of the current sequence of data elements based on the probabilities.

In some implementations, the current sequence of data elements is iteratively extended by a beam search optimization technique.

In some implementations, the current sequence of data elements is iteratively extended by a greedy optimization technique.

In some implementations, the current sequence of data elements is iteratively extended by an exhaustive search optimization technique.

In some implementations, each of a plurality of nodes of the tree model are associated with both: (i) a data element, and (ii) a plurality of magnitude values; and iteratively extending the current sequence of data elements over the plurality of iterations further comprises, at each of one or more iterations: determining a predicted magnitude value associated with a new data element selected to extend the current sequence of data elements at the iteration.

In some implementations, determining the predicted magnitude value associated with the new data element selected to extend the current sequence of data elements at the iteration comprises: determining the predicted magnitude value associated with the new data element as a mean of a conditional probability distribution that is determined by executing a query on the tree model, wherein the conditional probability distribution is a marginal distribution of a multivariate Normal distribution over magnitude values associated with data elements in the current sequence of data elements, wherein the conditional probability distribution is conditioned on magnitude values associated with data elements preceding the new data element in the current sequence of data elements.

In some implementations, processing the input sequence of data elements to generate the output sequence of data elements further comprises: executing a query on the tree model to obtain metadata features associated with paths in the tree model that were used to generate the output sequence of data elements; and providing the metadata features as interpretability data characterizing a rationale for how the output sequence of data elements was generated.

In some implementations, the sequence modeling task is a machine translation task, wherein the input sequence of data elements is a piece of text in a source language, and wherein the output sequence of data elements is a translation of the piece of text into a target language.

In some implementations, the sequence modeling task is a query answering task, wherein the input sequence of data elements is a natural language query, and wherein the output sequence of data elements is a natural language response to the natural language query.

In some implementations, the trained tree model is used to perform an agent control task to control an agent interacting with an environment; and wherein the agent control task comprises, at each time step in a sequence of time steps, selecting an action to be performed by the agent at the time step.

In some implementations, each training example defines a trajectory representing interaction of the agent with the environment over a sequence of time steps, wherein each data element in each training example corresponds to a respective time step and comprises data defining: (i) a state of the environment at the time step, (ii) an action performed by the agent at the time step, and (iii) a reward received by the agent at the time step.

In some implementations, training the tree model on the set of training examples further comprises, for each of one or more target data elements in each of one or more training examples: determining a sequence-action value associated with the target data element based on a cumulative measure of rewards included in data elements following the target data element in the sequence of data elements; and updating a sequence-action value feature associated with a node in the tree model that represents the action from the target data element in a path in the tree model that represents the sequence of data elements of the training example using the sequence-action value associated with the target data element.

In some implementations, the method further comprises incrementing a sequence-action count associated with the node in the tree model that represents the action from the target data element in the path in the tree model that represents the sequence of data elements of the training example.

In some implementations, at each time step in the sequence of time steps, selecting the action to be performed by the agent at the time step comprises: executing a query on the tree model to determine, for each action in a set of possible actions: (i) a sequence-action value, and (ii) a sequence-action count, from a path in the tree model that represents a trajectory of state-action pairs defining interaction of the agent with the environment prior to the time step; generating a score distribution over the set of possible actions using the sequence-action values and the sequence-action counts; and selecting an action in accordance with the score distribution over the set of possible actions.

In some implementations, selecting an action in accordance with the score distribution over the set of possible actions comprises: selecting an action having a highest score under the score distribution over the set of possible actions; or stochastically sampling an action from the score distribution over the set of possible actions.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect, there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

The tree model can explicitly represent each example sequence used to train the tree model. In particular, each parameter of the tree model can be determined by and directly associated with a subset of example data elements or example sequences for the sequence modeling task. The trec model can be trained on and explicitly represent very large numbers of training examples (e.g., millions of training examples) for the sequence modeling task and can encode highly complex and sophisticated rules for the sequence modeling task well beyond what could be performed in the human mind or with pen and paper. Such explicit representation of the example sequences for the sequence modeling task provides the described systems various advantages at both training and inference time as compared to conventional methods for performing sequence modeling tasks.

For example, in some implementations, the tree model can include interpretability metadata identifying how the parameters of the model are determined by the example sequences for the sequence modeling task. When generating an output sequence, the described systems can query the tree model to obtain the interpretability metadata associated with the output sequence and can provide the relevant metadata to help explain how the system generated the output sequence based on the example sequences for the sequence modeling task. By explicitly representing the example sequences used to train the tree model, the tree model can therefore be used to produce more interpretable predictions as compared to conventional machine learning methods.

Additionally, by explicitly representing the example sequences for the sequence modeling task, the tree model can be updated and queried in parallel, e.g., as part of performing distributed training or distributed inference for the sequence modeling task. For example, the described systems can execute queries and updates on the tree model substantially in parallel as part of, e.g., processing multiple input sequences using the tree model, updating the tree model using multiple example sequences during training, and so on. Such parallelization can decrease training and inference costs (e.g., processing time, processing latency, etc.) for a sequence modeling task.

Additionally, as part of training the tree model, the described systems can directly update the parameters of the model without performing backpropagation, which can further reduce the computational cost of training the model as compared to conventional machine learning methods that utilize neural networks.

Conventional machine learning methods for performing sequence modeling tasks typically utilize large and complex neural networks, such as Transformer networks that include hundreds of millions, billions, or even trillions of parameters. However, as each parameter of a neural network is only indirectly determined by the training examples used to train the neural network, conventional neural networks for sequence modeling often require more parameters to perform a sequence modeling task than are needed to represent the example sequences for the task. The described systems can therefore utilize a smaller, more lightweight tree model to explicitly represent the example sequences for a sequence modeling task to attain a same or better performance as compared to conventional neural network methods for sequence modeling.

Unlike conventional neural networks for sequence modeling, the described systems can automatically optimize the topology (e.g., architecture) of the tree model to explicitly represent the contents of the training data for the tree model, which can improve accuracy of predictions generated using the tree model during inference. Although the described systems can optimize the tree model to explicitly represent the training data, the described systems can generate generalized predictions for input sequences that are not explicitly represented within the training data. For example, the described systems can generate predictions for input sequences not explicitly represented in the training data based on patterns that appear in relevant disparate portions of the training data.

To represent the example sequences for the sequence modeling task, the tree model can utilize parameters associated with just data elements from the example sequences. This enables the number of parameters of the tree model to scale sub-linearly with the number of data elements within the example sequences for the sequence modeling task for typical applications. In particular, the number of parameters of the tree model scales at worst linearly with the number of data elements within the example sequences for the sequence modeling task only when the example sequences for the sequence modeling task are unique and do not include common prefix subsequences. This can enable the tree model to require significantly less memory to model the example sequences for the sequence modeling task as compared to, e.g., higher-order Markov models for sequence modeling, which include parameters that can scale exponentially with the sequence length by including parameters associated with each possible sequence of data elements for the sequence modeling task. For example, the tree model can require less than 1% of the memory space that is required to represent the collection of example sequences for the sequence modeling task as compared to, e.g., a Markovian transition tensor for a Markov model for the sequence modeling task that represents each possible combination of data elements for the sequence modeling task, a Transformer network trained to perform the sequence modeling task, and so on.

By explicitly representing the example sequences for the sequence modeling task, the tree model can therefore enable the described systems to perform sequence modeling tasks with significantly reduced training and inference costs as compared to conventional machine learning methods. This can enable the described systems to utilize a smaller, more lightweight tree model to generate more accurate predictions for the sequence modeling task as compared to conventional methods.

Additionally, the described systems can efficiently process input sequences of arbitrary length as compared to conventional methods for sequence modeling, which are often architecturally limited to processing fixed-length input sequences. Further, by utilizing the tree model, the described systems can process each data element of an input sequence with equal relevance when generating a corresponding output sequence. This can enable the described systems to generate output sequences as conditioned on arbitrarily deep histories for sequence modeling tasks while avoiding distance dependent input relevance that often affects conventional methods for performing sequence modeling with long input sequences. For example, the described systems can be used to perform action selection for an agent interacting with an environment as conditioned on an arbitrarily long history of the agent interacting with the environment, as compared to conventional reinforcement learning techniques which often select actions for the agent as conditioned only on a current state of the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 illustrates experimental results demonstrating performance of the methods described in this specification on an example sequence modeling task.

Like reference numbers and designations in the various drawings indicate like elements.

DETAILED DESCRIPTION

Figure 1:
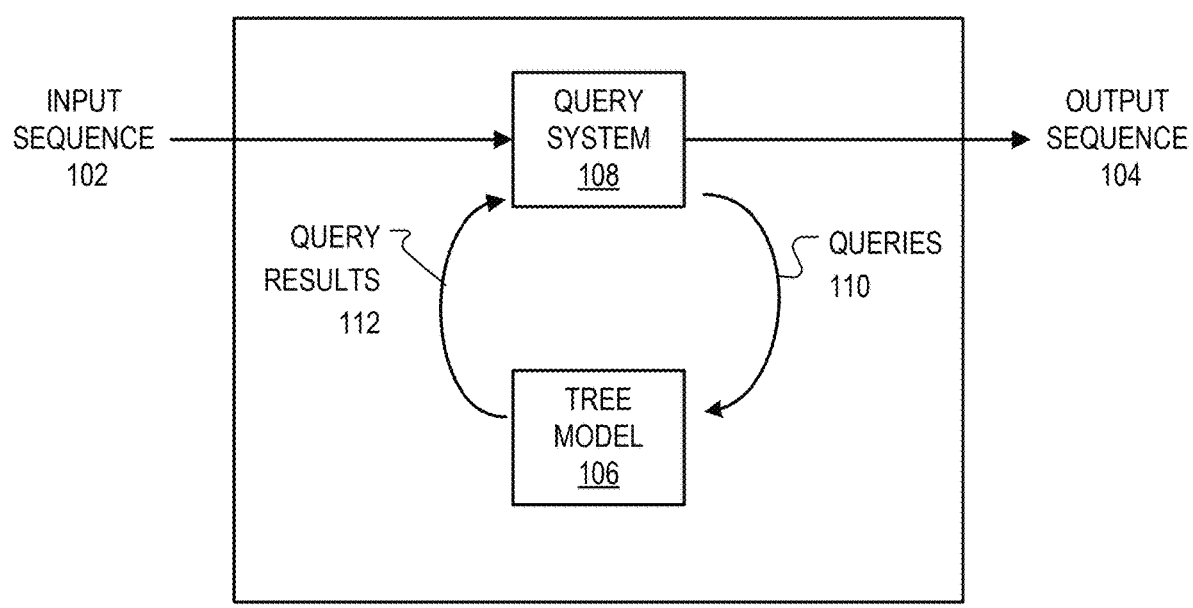
FIG. 1 is a block diagram of an example sequence modeling system.

FIG. 1 shows an example sequence modeling system 100. The sequence modeling system 100 is an example of a system implemented as computer programs on one or more computers in one or more locations in which the systems, components, and techniques described below are implemented.

The sequence modeling system 100 can perform a sequence modeling task by receiving and processing an input sequence of data elements 102 for the sequence modeling task to generate an output sequence of data elements 104 for the sequence modeling task.

In general, the input sequence 102 and the output sequence 104 can include data elements for any appropriate data modality for the sequence modeling task. For example, the input sequence 102 and the output sequence 104 can include data elements representing, e.g., text data, image data, audio data, video data, structured numerical data, molecule data, and so on in any appropriate combination for the sequence modeling task.

In particular, the input sequence 102 can be an input sequence of tokens representing input data for the sequence modeling task and the output sequence 104 can be an output sequence of tokens representing output data for the sequence modeling task. The input sequence 102 and the output sequence 104 can include tokens from a token vocabulary of the sequence modeling system 100. Each token of the token vocabulary of the system 100 can be associated with a respective data element for the sequence modeling task and can include an encoding for the associated data element. For example, the encoding of each token of the token vocabulary of the system 100 can be, e.g., a numerical index of the token within the token vocabulary of the system 100, a one-hot vector encoding representing the data element associated with the token, a vector embedding representing the data element associated with the token, and so on.

The token vocabulary of the sequence modeling system 100 can include tokens representing any appropriate data modality for the sequence modeling task. For example, the input sequence 102 can include a respective sequence of tokens representing input data for each input data modality of the sequence modeling task. Similarly, the output sequence 104 can include a respective sequence of tokens representing output data for each output data modality of the sequence modeling task.

For each input data modality for the sequence modeling task, the sequence modeling system 100 can generate a token sequence representing input data for the input data modality using a modality-specific tokenizer (e.g., a modality-specific encoder) for the input data modality. In particular, the tokenizer for each data modality can be configured to process input data for the data modality to generate sequences of tokens representing the input data for the data modality. For example, a text tokenizer can be configured to process input text to generate a sequence of text tokens that each represent one or more respective, e.g., letters, characters, words, and so on of the input text. As another example, an image tokenizer can be configured to process an input image to generate a sequence of image tokens that each represent a respective pixel or group of pixels (e.g., a patch) of the input image. As another example, a video tokenizer can be configured to process an input video to generate a sequence of video tokens that represent respective pixels or groups of pixels (e.g., patches) of video frames of the input video. As another example, an audio tokenizer can be configured to process input audio to generate a sequence of audio tokens that each represent a respective audio sample from the input audio. As another example, a tokenizer for a structured numerical data modality can be configured to process input data for the structured data modality to generate a sequence of structured numerical data tokens that each represent a respective subset of numerical values from the input data for the structured numerical data modality.

For each output data modality for the sequence modeling task, the sequence modeling system 100 can generate output data for the output data modality using a modality-specific de-tokenizer (e.g., a modality-specific decoder) for the output data modality. In particular, the de-tokenizer for each data modality can be configured process sequences of tokens representing output data for the data modality to generate the represented output data for the data modality.

In some implementations, for some or all of the data modalities for the sequence modeling task, the tokenizer and the de-tokenizer for the data modality can be jointly trained to optimize a quantization error for the data modality. For example, for some or all of the data modalities for the sequence modeling task, the tokenizer and the de-tokenizer can be jointly trained to perform vector quantization of data for the data modality. As another example, for some or all of the data modalities for the sequence modeling task, the tokenizer and the de-tokenizer for the data modality can be neural networks that are jointly trained to quantize data for the data modality, e.g., as described by van den Oord, et al., in "Neural Discrete Representation Learning," Advances in Neural Information Processing Systems, 30 (2017).

In some implementations, the token vocabulary of the sequence modeling system 100 can include tokens representing starts or ends of sequences. For example, the token vocabulary can include a start-of-sequence token representing the start of a token sequence. As another example, the token vocabulary can include an end-of-sequence token representing the end of a token sequence. As another example, the token vocabulary can include start-of-input-sequence and end-of-input-sequence tokens representing the start and end of the input sequence 102, respectively. As another example, the token vocabulary can include start-of-output-sequence and end-of-output sequence tokens representing the start and end of the output sequence 104, respectively.

The sequence modeling system 100 can be configured to perform any of a variety of sequence modeling tasks. Some example sequence modeling tasks are described below.

As one example, the sequence modeling task can be a text processing task that involves processing input text data (as represented by the input sequence 102) to generate output text data (as represented by the output sequence 104). For example, the sequence modeling task can be a machine translation task that involves processing a piece of text in a source language to generate a translation of the piece of text into a target language. As another example, the sequence modeling task can be a query answering task, that involves processing a natural language query to generate a natural language response to the natural language query.

As another example, the sequence modeling task can be a text-to-speech task that involves processing input text data (as represented by the input sequence 102) to generate output audio data (as represented by the output sequence 104). For example, the sequence modeling task can involve processing input natural language text to generate an audio narration of the input text.

As another example, the sequence modeling task can be a speech-to-text task that involves processing input audio data (as represented by the input sequence 102) to generate output text data (as represented by the output sequence 104). For example, the sequence modeling task can involve processing input speech data to generate a text transcription of the input speech data.

As another example, the sequence modeling task can be a chemical structure prediction task that involves generating data characterizing a predicted chemical structure of a molecule (as represented by the output sequence 104). For example, the input sequence 102 and the output sequence 104 can include tokens representing respective atoms or groups of atoms (e.g., functional groups, amino acid residues, nucleotides, etc.) within one or more molecules for the chemical structure prediction task. The input sequence 102 and the output sequence 104 can include, e.g., tokens representing SMILES strings specifying chemical structures for the one or more molecules for the chemical structure prediction task. As one example, the input sequence 102 can represent a chemical structure of a known portion of a molecule and the chemical structure prediction task can involve generating an output sequence 104 that represents a predicted chemical structure of an unknown portion of the molecule. As another example, the input sequence 102 can represent a chemical structure of a first molecule and the chemical structure prediction task can involve generating an output sequence 104 that represents a predicted chemical structure of a second molecule that is predicted to bind with the first molecule.

As another example, the sequence modeling task can be a time series data prediction task that involves processing input time sequence data (as represented by the input sequence 102) to generate predicted time sequence data (as represented by the output sequence 104). As an example, the input sequence 102 can represent observed values for a set of numerical features for the time series data prediction task over one or more time steps and the time series data prediction task can involve generating an output sequence 104 that represents predicted values for the set of numerical features for the time series data prediction task over one or more future time steps. As another example, the input sequence 102 can represent observed values for an input set of numerical features for the time series data prediction task over one or more time steps and the time series prediction task can involve generating an output sequence 104 that represents predicted values for an output set of numerical features for the time series prediction task over the one or more time steps.

As another example, the sequence modeling task can be an agent control task to control an agent interacting with an environment that involves processing input data representing states of the environment and actions taken by the agent over one or more previous time steps (e.g., as represented by the input sequence 102) to generate output data representing predicted states of the environment and planned actions to be performed by the agent over one or more future times steps (e.g., as represented by the output sequence 104). When the sequence modeling system 100 generates planned actions for an agent as part of performing an agent control task, the system 100 can provide the planned actions to the agent or to a control system of the agent to perform the planned actions in the environment. As one example, the environment can be a game and the agent control task can be to select actions for a player of the game. As another example, the agent can be a (mechanical) robot and the agent control task can be to select actions for the robot to perform to, e.g., navigate the environment, manipulate objects within the environment, and so on. As another example, the agent can be a vehicle and the agent control task can be to select actions for the vehicle to navigate within the environment.

The sequence modeling system 100 can select actions for the agent control task to optimize expected or predicted rewards for the agent control task. The rewards for each time step of the agent control task can depend on the complete sequence of prior environment states and agent actions at previous time steps of the task. The system 100 can therefore be used to perform agent control tasks that require, e.g., performing actions in given sequential order, navigating an environment in a manner that is heavily path-dependent, and so on.

An example process by which the sequence modeling system 100 can be used to control an agent as part of performing an agent control task is described in more detail below with reference to FIG. 6.

The sequence modeling system 100 can process the input sequence 102 and generate the output sequence 104 using a tree model 106 for the sequence modeling task. The tree model 106 for the sequence modeling task can be configured (e.g., trained) to model a distribution of example sequences for the sequence modeling task. In particular, as described in more detail below with reference to FIG. 2, the tree model 106 can explicitly model a set of example sequences for the sequence modeling task as a tree of nodes that each represent a respective data element from one or more of the example sequences. For each pair of consecutive data elements within each of the example sequences for the sequence modeling task, the tree model 106 can include a directed edge connecting the nodes representing the pair of consecutive data elements. The tree model 106 can therefore explicitly represent each example sequence for the sequence modeling task as a path of connected nodes representing data elements for the sequence modeling task.

For each example sequence, the tree model 106 can include a terminal (e.g., leaf) node that includes a count feature characterizing a number of occurrences of the example sequence within the set of example sequences for the sequence modeling task. The tree model 106 can therefore define a distribution of the set of example sequences for the sequence modeling task based on the count features for the example sequences.

An example process for training the tree model 106 to model the distribution of a set of example sequences for the sequence modeling task is described in more detail below with reference to FIG. 7.

The sequence modeling system 100 can auto-regressively generate the output sequence 104 in accordance with the distribution of example sequences for the sequence modeling task defined by the tree model 106. In particular, the system 100 can generate the output sequence 104 over a plurality of auto-regressive iterations. At each auto-regressive iteration, the system 100 can select one or more elements to extend the output sequence 104 in accordance with a conditional distribution of output elements for the output sequence 104 as determined by the tree model 106.

At each auto-regressive iteration, the sequence modeling system 100 can determine the conditional distribution of output elements for the iteration as conditioned on the input sequence 102 and any previously generated elements of the output sequence 104 by querying the tree model 106 using a query system 108. The query system 108 can generate queries 110 for the tree model 106 that include data characterizing the input sequence 102 and previously generated elements of the output sequence 104 and can receive corresponding query results 112 that include data characterizing conditional distributions of elements for the output sequence 104 as conditioned on the input sequence 102 and the previously generated elements of the output sequence 104. The system 100 can select the elements to extend the output sequence 104 at each auto-regressive iteration in accordance with the conditional distributions characterized by the query results 112.

As a particular example, the sequence modeling system 100 can store the tree model 106 for the sequence modeling task using a graph database and the query system 108 can provide the queries 110 and receive the query results 112 from the graph database to perform the sequence modeling task.

An example process by which the sequence modeling system 100 can generate the output sequence 104 using the tree model 106 is described in more detail below with reference to FIG. 3.

As the tree model 106 explicitly represents each example sequence used to train the model 106 to perform the sequence modeling task, the system 100 can, in some implementations, query the tree model 106 to provide a rationale for how the system 100 generated the output sequence 104. As described in more detail below with reference to FIG. 2, the tree model 106 can include interpretability metadata identifying how the parameters of the model 106 are determined by the example sequences for the sequence modeling task. When generating the output sequence 104, the system 100 can also query the model 106 to obtain the interpretability metadata associated with the output sequence 104 and can provide the relevant metadata to help explain how the system 100 generated the output sequence 104 based on the example sequences for the sequence modeling task. By explicitly representing the example sequences used to train the tree model 106, the tree model 106 can therefore be used to produce more interpretable predictions as compared to conventional machine learning methods.

By explicitly representing the example sequences for the sequence modeling task, the tree model 106 can be updated and queried in parallel, e.g., as part of performing distributed training or distributed inference for the sequence modeling task. For example, the system 100 can execute queries and updates on the tree model 106 substantially in parallel as part of, e.g., processing multiple input sequences using the model 106, updating the model 106 using multiple example sequences during training, and so on. Such parallelization can decrease training and inference costs (e.g., processing time, processing latency, etc.) for the sequence modeling task.

Additionally, as part of training the tree model 106, the system 100 can directly update the parameters of the model 106 without performing backpropagation, which can further reduce the computational cost of training the model 106 as compared to conventional machine learning methods that utilize neural networks.

To represent the example sequences for the sequence modeling task, the tree model 106 can utilize parameters associated with just data elements from the example sequences. This enables the number of parameters of the tree model 106 to scale sub-linearly with the number of data elements within the example sequences for the sequence modeling task for typical applications. In particular, the number of parameters of the tree model 106 scales at worst linearly with the number of data elements within the example sequences for the sequence modeling task only when the example sequences for the sequence modeling task are unique and do not share common prefix subsequences. This can enable the tree model 106 to require significantly less memory to model the example sequences for the sequence modeling task as compared to, e.g., higher-order Markov models for sequence modeling, which include parameters that scale exponentially with the sequence length by including parameters associated with each possible sequence of data elements for the sequence modeling task. For example, the tree model 106 can require less than 1% of the memory space that is required to represent the collection of example sequences for the sequence modeling task as compared to, e.g., a Markovian transition tensor for a Markov model for the sequence modeling task that represents each possible combination of data elements for the sequence modeling task, a Transformer network trained to perform the sequence modeling task, and so on.

Additionally, the sequence modeling system 100 can efficiently process input sequences of arbitrary length as compared to conventional methods for sequence modeling, which are often architecturally limited to processing fixed-length input sequences. Further, by utilizing the tree model 106, the sequence modeling system 100 can process each data element of the input sequence 102 with equal relevance when generating the output sequence 104. This can enable the sequence modeling system 100 to generate the output sequence 104 as conditioned on an arbitrarily deep history for the sequence modeling task while avoiding distance dependent input relevance that often affects conventional methods for performing sequence modeling with long input sequences. For example, the sequence modeling system 100 can be used to perform action selection for an agent interacting with an environment as conditioned on an arbitrarily long history of the agent interacting with the environment, as compared to conventional reinforcement learning techniques which often select actions for the agent as conditioned only on a current state of the environment.

By explicitly representing the example sequences for the sequence modeling task, the tree model 106 can therefore enable the sequence modeling system 100 to perform the sequence modeling task with significantly reduced training and inference costs as compared to conventional machine learning methods. As illustrated by experimental results provided below with reference to FIG. 8, this can enable the sequence modeling system 100 to utilize a smaller, more lightweight tree model 106 to generate more accurate predictions for the sequence modeling task as compared to conventional methods.

Figure 2:
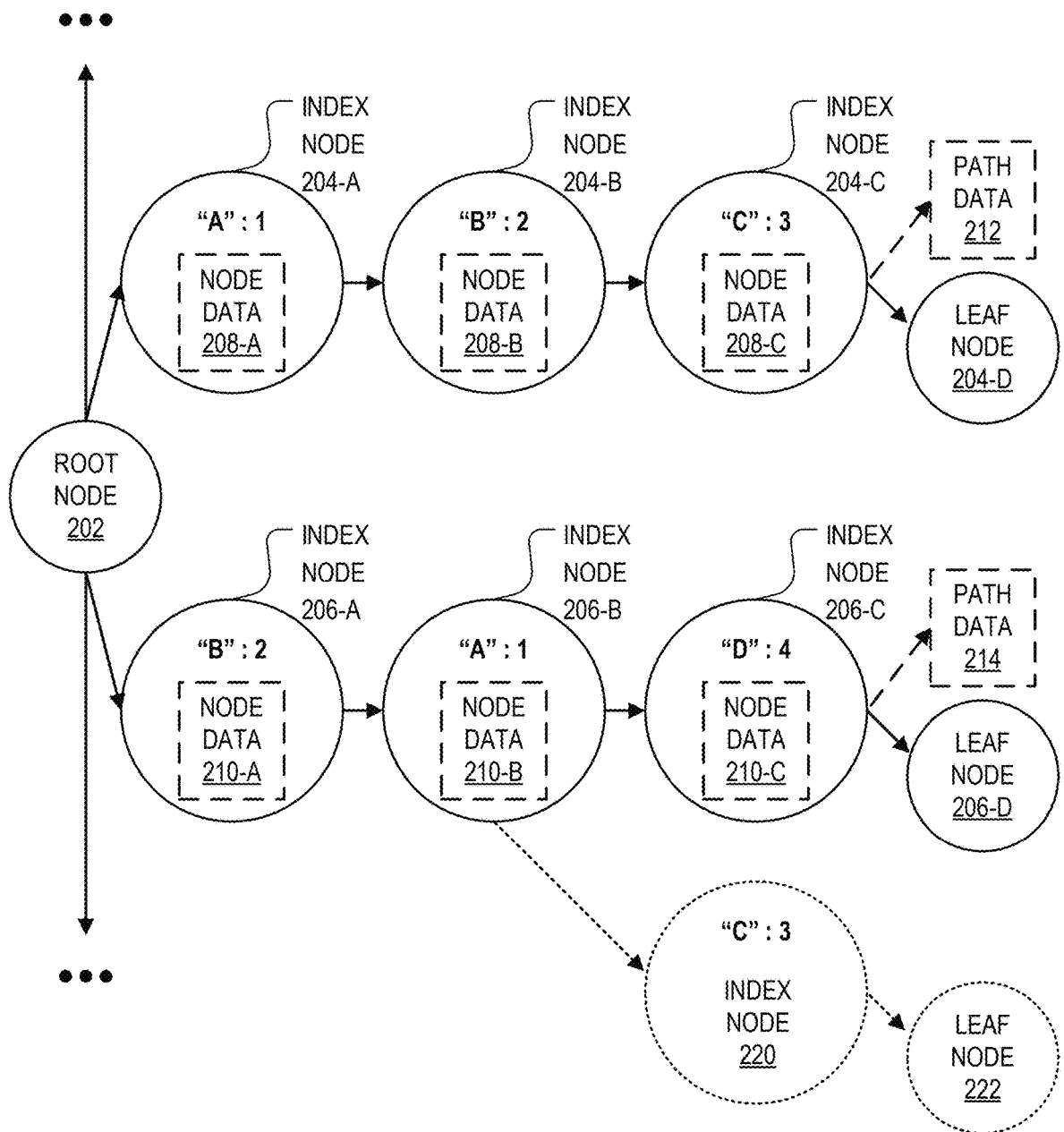
FIG. 2 illustrates an example tree model for a sequence modeling task.

FIG. 2 illustrates an example tree model 106 for a sequence modeling task.

As described above, the tree model 106 can explicitly model a set of example sequences for the sequence modeling task as a tree of nodes that each represent a respective data element from one or more of the example sequences. For each pair of consecutive data elements within an example sequence, tree model 106 can include a directed edge connecting the nodes representing the pair of consecutive data elements for the example sequence. The tree model 106 can include a root node 202 and, for each example sequence, a respective graph edge that connects the root node 202 with the node representing the first data element of the example sequence. For each example sequence, the tree model 106 can include a terminal leaf node for the example sequence and a respective graph edge that connects the node representing the last data element of the example sequence with the leaf node for the example sequence.

The tree model 106 can therefore explicitly represent each example sequence for the sequence modeling task as a path of connected nodes (e.g., index nodes) representing data elements for the sequence modeling task that connects the root node 202 of the tree to the leaf node of the tree for the example sequence. For example, the tree model 106 illustrated in FIG. 2 includes index nodes 204-A through 204-C and a leaf node 204-D representing a first example sequence for the sequence modeling task and includes index nodes 206-A through 206-C and a leaf node 206-D representing a second example sequence for the sequence modeling task. In particular, the index nodes 204-A through 204-C and the leaf node 204-D can represent the example sequence of data elements [A, B, C] and the index nodes 206-A through 206-C and the leaf node 206-D can represent the example sequence of data elements [B, A, D] (e.g., where A, B, C, and D are data elements for the sequence modeling task).

Each of the index nodes of the tree model 106 can include data identifying the data element for the sequence modeling task represented by the index node. Each index node of the tree model 106 can represent a data element by including, e.g., an index of the represented data element within a token vocabulary of the model 106, a one-hot vector encoding for the represented data element, a vector embedding of the represented data element, and so on.

As an example, the tree model 106 illustrated in FIG. 2 can have a token vocabulary that includes the data elements A, B, C, and D at indices 1, 2, 3, and 4, respectively. The index nodes 204-A and 206-B can include the index of data element A, the index nodes 204-B and 206-A can include the index of data element B, the index node 204-C can include the index of data element C, and the index node 206-C can include the index of data element D.

The leaf node for each example sequence represented by the tree model 106 can include a count feature that characterizes a number of occurrences of the example sequence within the set of example sequences for the sequence modeling task. The count feature of a leaf node for an example sequence can be, e.g., the number of occurrences of the example sequence within the set of example sequences, a function (e.g., a non-negative function) of the number of occurrences of the example sequence within the set of example sequences, and so on. For example, the count feature of the leaf node 204-D can characterize a number of occurrences of the sequence [A, B, C] within the set of example sequences for the model 106 and the count feature of the leaf node 206-D can characterize a number of occurrences of the sequence [B, A, D] within the set of example sequences for the model 106.

As described in more detail below with reference to FIG. 7, the tree model 106 can be updated to represent an occurrence of an example sequence for the sequence processing task by (i) including appropriately connected nodes (e.g., including index nodes and a leaf node) representing the data elements of the example sequence, if the model 106 does not include nodes representing the example sequence and (ii) updating the count feature of the leaf node for the example sequence to characterize an updated (e.g., incremented) count of occurrences of the example sequence.

When two example sequences do not share a common "prefix" of data elements, the tree model 106 can represent the example sequences as separate paths of index nodes. A prefix of a sequence of data elements is a subsequence of the first one or more data elements of the sequence of data elements. Two sequences of data elements therefore do not share a common prefix of data elements when the two sequences include different first data elements. For example, as illustrated in FIG. 2, the tree model 106 uses separate paths of index nodes 204-A through 204-C and 206-A through 206-C to represent the example sequences [A, B, C] and [B, A, D], which do not share a common prefix of data elements.

In general, the tree model 106 can efficiently represent different example sequences that do share a same prefix as paths of nodes that branch from a sequence of nodes representing the shared prefix. For example, to represent the sequences of data elements [B, A, D] and [B, A, C], which share the common prefix sequence of data elements [B, A], the tree model 106 can use a same connected sequence of index nodes representing the subsequence [B, A] to represent the shared prefix for both example sequences. In particular, the tree model 206 can use the index nodes 206-A and 206-B to represent the shared prefix [B, A] for both example sequences [B, A, D] and [B, A, C].

The tree model 106 can include paths representing the remaining suffixes of the different example sequences excluding the common prefix (e.g., the remaining subsequences of the last one or more data elements of the example sequences excluding the common prefix) as separate paths through the tree model branching from the path representing the common prefix. For example, the index node 206-B can be connected to both the index node 206-C representing the data element D in the example sequence [B, A, D] and an index node 220 representing the data element C in the example sequence [B, A, C]. The tree model 106 can therefore represent the example sequence [B, A, D] as the path of index nodes 206-A, 206-B, and 206-C, to the leaf node 206-D that includes the count feature for the example sequence [B, A, D] and can represent the example sequence [B, A, C] as the path of index nodes 206-A, 206-B, and 220 to a leaf node 222 that includes a count feature for the example sequence [B, A, C].

By representing the set of example sequences for the sequence modeling task as such branching paths from the root node 202 to respective leaf nodes for the example sequences, the tree model 106 can efficiently model a distribution of the set of example sequences using the count features for the example sequences. In particular, for each example sequence for the sequence modeling task, the tree model 106 can define both (i) a likelihood for the example sequence based on the count feature of the leaf node for the example sequence and (ii) a conditional likelihood of each data element within the example sequence (e.g., as conditioned on any preceding data elements of the example sequence) based on a combination of the count features of each descendent leaf node connected to the index node representing the data element. For example, the tree model 106 can define a relative likelihood of the example sequences [B, A, D] and [B, A, C] based on the count features of the leaf nodes 206-D and 220.

As described in more detail below with reference to FIG. 3, a sequence modeling system (e.g., the sequence modeling system 100 of FIG. 1) can use the tree model 106 to autoregressively generate output sequences for the sequence modeling task by generating output data elements in accordance with the conditional likelihoods for the output data elements defined by the tree model 106.

In some implementations, the example sequences for the sequence modeling task can include numerical values associated with the data elements of the example sequences. For example, when the sequence modeling task is a time-series data prediction task, each example sequence can include example time-series data for the time-series data prediction task. Each data element of an example sequence for the time-series data prediction task can represent a state of the time-series at a respective time of the time-series and can include numerical values for the time-series at the time of the data element within the time-series.

As another example, when the sequence modeling task is an agent control task for an agent interacting with an environment, each example sequence can represent an example interaction of the agent with the environment over a sequence of time steps. An example sequence for the agent control task can represent an example interaction of the agent with the environment by including, for each time step of the example interaction, a data element representing a state of the environment at the time step and a data element representing an action taken by the agent to interact with the environment at the time step. Each data element of an example sequence for the agent control task can include numerical values specifying an expected or a received reward associated with the data element (e.g., a reward associated with a state of the environment represented by the data element, a reward associated with an action represented by the data element, etc.).

When data elements for the sequence modeling task are associated with numerical values, the tree model 106 can include data specifying the numerical values associated with each of the example sequences represented by the tree model 106 by any appropriate method. For example, in some implementations, each index node of the tree model 106 can include respective node data specifying numerical values of the data element represented by the index node. As a further example, the index nodes 204-A, 204-B, and 204-C illustrated in FIG. 2 can include respective node data 208-A, 208-B, and 208-C specifying the numerical values associated with the data elements A, B, and C within the occurrences of the sequence [A, B, C] within the set of example sequences for the sequence modeling task. Similarly, the index nodes 206-A, 206-B, and 206-C illustrated in FIG. 2 can include respective node data 210-A, 210-B, and 210-C specifying the numerical values associated with the data elements B, A, and D within the occurrences of the sequence [B, A, D] within the set of example sequences for sequence modeling task.

In other implementations, for each example sequence represented by the tree model 106, the tree model 106 can include respective path data (e.g., within a leaf node for the example sequence) that specifies the numerical values associated with each occurrence of the example sequence within the set of example sequences for sequence modeling task. For example, the tree model 106 can include path data 212 associated with the path of index nodes 204-A, 204-B, 204-C that specifies the numerical values associated with the occurrences of the sequence [A, B, C] within the set of example sequences for sequence modeling task. Similarly, the tree model 106 can include path data 214 associated with the path of index nodes 206-A, 206-B, 206-C that specifies the numerical values associated with the occurrences of the sequence [B, A, D] within the set of example sequences for sequence modeling task.

As a particular example, the set of example sequences for the sequence modeling task can include the example sequences with associated numerical values listed below:
[(A, 10.9), (B, 21.8), (C, 29.8)],
[(A, 10.8), (B, 19.8), (C, 34.8)],
  [(A, 7.9), (B, 15.0), (C, 32.9)],
  [(A, 9.2), (B, 21.8), (C, 24.4)],
  [(A, 8.7), (B, 19.7), (C, 29.4)],
[(B, 198.5), (A, 101.3), (D, 394.4)],
[(B, 197.4), (A, 103.5), (D, 401.0)],
  [(B, 200.4), (A, 94.1), (D, 392.4)],
  [(B, 202.1), (A, 98.2), (D, 399.5)],
  [(B, 205.8), (A, 98.1), (D, 403.7)], When the tree model 106 includes node data specifying numerical values associated with each index node, the node data 208-A can specify the numerical values [10.9, 10.8, 7.9, 9.2, 8.7], the node data 208-B can specify the numerical values [21.8, 19.8, 15.0, 21.8, 19.7], the node data 208-C can specify the numerical values [29.8, 34.8, 32.9, 24.4, 29.4], the node data 210-A can specify the numerical values [198.5, 197.4, 200.4, 202.1, 205.8], the node data 210-B can specify the numerical values [101.3, 103.5, 94.1, 98.2, 98.1], and the node data 210-C can specify the numerical values [394.4, 401.0, 392.4, 399.5, 405.7].

When the tree model 106 includes path data specifying numerical values associated with each example sequence, the path data 212 can specify the set of sequences of numerical values [[10.9, 21.8, 29.8], [10.8, 19.8, 34.8], [7.9, 15.0, 32.9], [9.2, 21.8, 24.4], [8.7, 19.7, 29.4]] and the path data 214 can specify the set of sequences of numerical values [[198.5, 101.3, 394.4], [197.4, 103.5, 401.0], [200.4, 94.1, 392.4], [202.1, 98.2, 399.5], [205.8, 98.1, 403.7]].

In general, the tree model 106 can include any appropriate structured numerical data (e.g., scalar values, vectors, matrices, multi-dimensional arrays, etc.) associated with the data elements of the sequence modeling task.

As described in more detail below with reference to FIG. 3, as part of autoregressively generating output sequences for the sequence modeling task, a sequence modeling system (e.g., the sequence modeling system 100 of FIG. 1) can use the numerical data stored by the tree model 106 for the example sequences to generate predicted numerical values for the output sequences.

In some implementations, each index node of the tree model 106 can include data characterizing the count features of all leaf nodes descendent from the index node in the tree model 106. This can enable the sequence modeling system to more efficiently determine the count features for paths descendent from each index node as part of autoregressively generating output sequences for the sequence modeling task.

In some implementations, the tree model 106 can include metadata that can be used to provide a rationale for output predictions generated using the model 106. For example, in some implementations, each index node of the tree model can include interpretability metadata that specifies which example sequences used to train the model 106 include the data element represented by the index node. As another example, in some implementations, each example sequence represented by the model 106 can be associated with interpretability metadata (e.g., as included within a leaf node for the example sequence) that identifies occurrences of the example sequence that were used to train the model 106. As described in more detail below with reference to FIG. 3, when generating an output sequence using the tree model 106, the tree model 106 can be queried to obtain the interpretability metadata associated with the output sequence in order to provide rationales for how the output sequence of data elements is generated.

Figure 3:
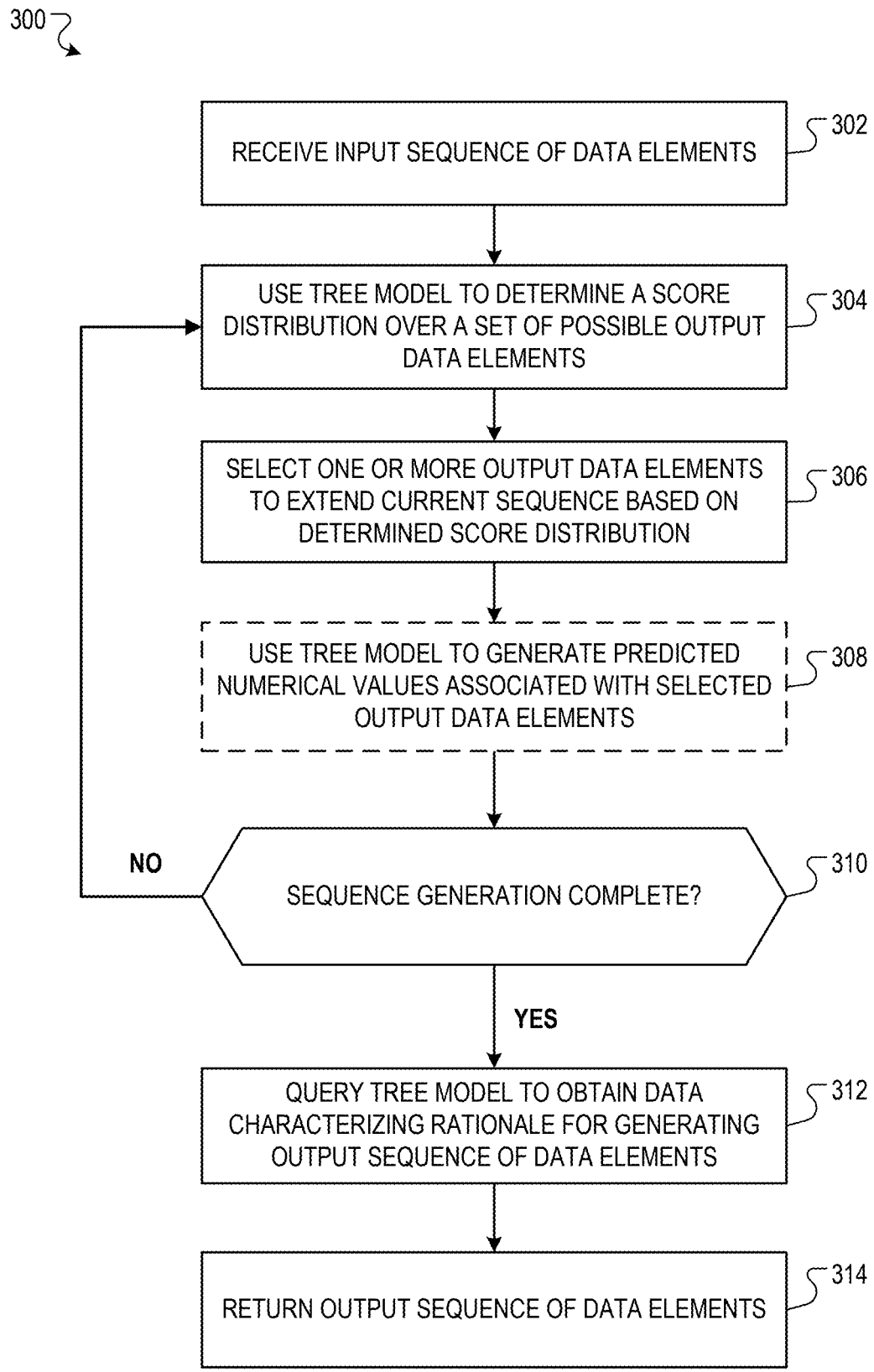
FIG. 3 is a flow diagram of an example process for using a tree model to perform a sequence modeling task.

FIG. 3 is a flow diagram of an example process 300 for using a tree model to perform a sequence modeling task. For convenience, the process 300 will be described as being performed by a system of one or more computers located in one or more locations. For example, a sequence modeling system, e.g., the sequence modeling system 100 of FIG. 1, appropriately programmed in accordance with this specification, can perform the process 300.

The system can receive an input sequence of data elements for the sequence modeling task (step 302). The system can receive the input sequence of data elements from any appropriate source. For example, the system can receive the input sequence of data elements from a user, e.g., by means of a user interface (UI) of the system. As another example, the system can receive the input sequence of data elements from another system, e.g., by means of an application programming interface (API) of the system.

As described above with reference to FIG. 1, the input sequence can include data elements for any appropriate data modality for the sequence modeling task. For example, the input sequence of data elements can include data elements representing, e.g., text data, image data, audio data, video data, structured numerical data, molecule data, and so on in any appropriate combination for the sequence modeling task.

As an example, the sequence modeling task can be a text processing task that involves processing input text data characterized by the input sequence of data elements to generate output text data. For example, the sequence modeling task can be a machine translation task that involves processing a piece of text in a source language characterized by the input sequence of data elements to generate a translation of the piece of text into a target language. As another example, the sequence modeling task can be a query answering task, that involves processing a natural language query characterized by the input sequence of data elements to generate a natural language response to the natural language query.

As another example, the sequence modeling task can be a text-to-speech task that involves processing input text data characterized by the input sequence of data elements to generate output audio data. For example, the sequence modeling task can involve processing input natural language text characterized by the input sequence of data elements to generate an audio narration of the input text.

As another example, the sequence modeling task can be a speech-to-text task that involves processing input audio data characterized by the input sequence of data elements to generate output text data. For example, the sequence modeling task can involve processing input speech data characterized by the input sequence of data elements to generate a text transcription of the input speech data.

As another example, the sequence modeling task can be a chemical structure prediction task that involves generating data characterizing a predicted chemical structure of a molecule. As one example, the input sequence of data elements can represent a chemical structure of a known portion of a molecule and the chemical structure prediction task can involve generating a predicted chemical structure of an unknown portion of the molecule. As another example, the input sequence of data elements can represent a chemical structure of a first molecule and the chemical structure prediction task can involve generating a predicted chemical structure of a second molecule that is predicted to bind with the first molecule.

As another example, the sequence modeling task can be a time series data prediction task that involves processing input time sequence data characterized by the input sequence of data elements to generate predicted time sequence data. As an example, the input sequence of data elements can represent observed values for a set of numerical features for the time series data prediction task over one or more time steps and the time series data prediction task can involve generating predicted values for the set of numerical features for the time series data prediction task over one or more future time steps. As another example, the input sequence of data elements can represent observed values for an input set of numerical features for the time series data prediction task over one or more time steps and the time series prediction task can involve generating predicted values for an output set of numerical features for the time series prediction task over the one or more time steps.

As another example, the sequence modeling task can be an agent control task to control an agent interacting with an environment that involves processing the input sequence of data elements representing states of the environment and actions taken by the agent over one or more previous time steps to generate output data representing predicted states of the environment and planned actions to be performed by the agent over one or more future times steps. As one example, the environment can be a game and the agent control task can be to select actions for a player of the game. As another example, the agent can be a (mechanical) robot and the agent control task can be to select actions for the robot to perform to, e.g., navigate the environment, manipulate objects within the environment, and so on. As another example, the agent can be a vehicle and the agent control task can be to select actions for the vehicle to navigate within the environment.

The input sequence of data elements can be an input sequence of tokens from a token vocabulary of the system representing input data for the sequence modeling task. Each token of the token vocabulary of the system can be associated with a respective data element for the sequence modeling task and can include an encoding for the associated data element. The encoding of each token of the token vocabulary of the system can be, e.g., a numerical index of the token within the token vocabulary of the system, a one-hot vector encoding representing the data element associated with the token, a vector embedding representing the data element associated with the token, and so on.

The input sequence of data elements can include a respective sequence of tokens representing input data for each input data modality of the sequence modeling task. The respective sequences of tokens for each input data modality of the sequence modeling task can be generated (e.g., by the system or by another system) by processing input data for the input data modality using a tokenizer for the data modality.

In some implementations, the system can receive input numerical values (e.g., input magnitude or scalar values, input vector data, input multi-dimensional data) associated with one or more of the input data elements.

The system can process the input sequence of data elements to generate an output sequence of data elements for the sequence modeling task. In particular, the system can iteratively (e.g., autoregressively) generate the output sequence over a sequence of one or more autoregressive iterations. At each autoregressive iteration, the system can perform steps 304 through 308 described below.

The system can use the tree model to determine a score distribution over a set of possible output data elements to extend a current sequence as of the autoregressive iteration (step 304). At the first autoregressive iteration, the system can initialize the current sequence of data elements to be the input sequence of data elements. At each subsequence autoregressive iteration, the current sequence of data elements can include the input sequence of data elements and the output data elements selected to extend the current sequence during previous autoregressive iterations.

At each autoregressive iteration, the system can use the current sequence of data elements to execute a query on the tree model to determine the score distribution over the set of possible output data elements. In particular, the system can use the current sequence of data elements to query a graph database storing the tree model to determine the score distribution of the set of possible output data elements.

In some cases, the set of possible data elements can include each token of the token vocabulary of the system. In other cases, the system can determine the set of possible data elements based on the current sequence of data elements. For example, in some implementations, the system can determine the set of possible data elements to be the set of each data element that is included in at least one path in the tree model that represents a sequence of data elements that extends the current sequence by the data element.

The system can determine the score distribution over the set of possible data elements by determining a respective score for each possible data element. The system can determine the score for the given data element based on the count features of any paths in the tree model that extend the current sequence by the given data element.

For example, given a current sequence of data elements, $x_1 \ldots x_N$, the system can determine the score for a possible data element $x_{N+1}$ following:

$$s(x_{N+1}|x_1\ldots,x_N) = \frac{\sum_{l \in L(x_1,\ldots,x_N,x_{N+1})} c_l}{\sum_{x'_{N+1} \in P} \sum_{l \in L(x_1,\ldots,x_N,x'_{N+1})} c_l}$$

Where $c_l$ is the count feature for a leaf node l of the tree model, $L(x_1, \ldots, x_N x_{N+1})$ is the set of all leaf nodes in the tree model that are descendent from a path in the tree model that extends the current sequence of data elements $x_1 \ldots x_N$ by the data element $x_{N+1}$, P is the set of possible data elements, and $L(x_1, \ldots, x_N, x'_{N+1})$ is the set of all leaf nodes in the tree model that are descendent from a path in the tree model that extends the current sequence of data elements $x_1 \ldots x_N$ by the possible data element $x'_{N+1}$.

As another example, given a current sequence of data elements, $x_1 \ldots x_N$, the system can determine the score for a possible data element $x_{N+1}$ following:

$$s(x_{N+1}|x_1\ldots,x_N) = \frac{\sum_{l \in L(x_1,\ldots,x_N,x_{N+1})} e^{c_l}}{\sum_{x'_{N+1} \in P} \sum_{l \in L(x_1,\ldots,x_N,x'_{N+1})} e^{c_l}}$$

As another example, given a current sequence of data elements, $x_1 \ldots x_N$, the system can determine the score for a possible data element $x_{N+1}$ following:

$$s(x_{N+1}|x_1\ldots,x_N) = \frac{e^{\sum_{l \in L(x_1,\ldots,x_N,x_{N+1})} c_l}}{\sum_{x'_{N+1} \in P} e^{\sum_{l \in L(x_1,\ldots,x_N,x'_{N+1})} c_l}}$$

In some implementations, the system can determine scores for output sequences of multiple output data elements to extend the current sequence of data elements. For example, given a current sequence of data elements, $x_1 \ldots x_N$, the system can determine the score for a sequence of L output data elements $x_{N+1}, \ldots, x_{N+L}$ following:

$$s(x_{N+1},\ldots,x_{N+L}|x_1\ldots,x_N) = \frac{\sum_{l \in L(x_1,\ldots,x_N,x_{N+1}\ldots,x_{N+L})} c_l}{\sum_{X \in P} \sum_{l \in L(x_1,\ldots,x_N,X)} c_l}$$

$L(x_1, \ldots, x_N, x_{N+1}, \ldots, x_{N+L})$ is the set of all leaf nodes in the tree model that are descendent from a path in the tree model that extends the current sequence of data elements $x_1 \ldots x_N$ by the sequence of data elements $x_{N+1}, \ldots, x_{N+L}$, P is the set of possible output sequences of data elements, and $L(x_1, \ldots, x_N, X)$ is the set of all leaf nodes in the tree model that are descendent from a path in the tree model that extends the current sequence of data elements $x_1 \ldots x_N$ by the possible sequence of output data elements X.

As another example, given a current sequence of data elements, $x_1 \ldots x_N$, the system can determine the score for a sequence of L output data elements $x_{N+1}, \ldots, x_{N+L}$ following:

$$s(x_{N+1}, \ldots, x_{N+L} | x_1 \ldots, x_N) = \frac{e^{\sum_{l \in \mathcal{L}(x_1, \ldots, x_N, x_{N+1} \ldots, x_{N+L})} e^{c_l}}}{\sum_{X \in \mathcal{P}} e^{\sum_{l \in \mathcal{L}(x_1, \ldots, x_N, X)} e^{c_l}}}$$

As another example, given a current sequence of data elements, $x_1 \ldots x_N$, the system can determine the score for a sequence of L output data elements $x_{N+1}, \ldots, x_{N+L}$ following:

$$s(x_{N+1}, \ldots, x_{N+L} | x_1 \ldots, x_N) = \frac{e^{\sum_{l \in \mathcal{L}(x_1, \ldots, x_N, x_{N+1} \ldots, x_{N+L})^{c_l}}}}{\sum_{X \in \mathcal{P}} e^{\sum_{l \in \mathcal{L}(x_1, \ldots, x_N, X)^{c_l}}}}$$

When the tree model does not include any paths that extend current sequence, $x_1 \ldots x_N$, by an output sequence of one or more data elements, X, the system can determine the score for the output sequence to be a default score and determine a default score feature for the output sequence.

For example, the system can determine the tree model does not include any paths that extend current sequence, $x_1 \ldots x_N$, by an output sequence of one or more data elements, X, the system (e.g., when $L(x_1, \ldots, x_N, X) = \emptyset$) can define:

$$\sum_{l \in \mathcal{L}(x_1, \ldots, x_N, X)} c_l = 0$$

$$\sum_{l \in \mathcal{L}(x_1, \ldots, x_N, X)} e^{c_l} = 1$$

$$e^{\sum_{l \in \mathcal{L}(x_1, \ldots, x_N, X)^{c_l}}} = 1$$

For the purpose of determining the scores for possible data elements. This can enable the system to generate output sequences of data elements that are not included within the set of example sequences used to train the tree model, while only requiring the tree model to include data associated with the set of example sequences for the sequence modeling task. In particular, by determining such default scores and default score features for "zero-count" output sequences (e.g., output sequences that are not included within the set of example sequences used to train the tree model), the system can use the tree model to implicitly represent zero-count output sequences without storing additional data.

Such implicit representation of zero-count output sequences can significantly reduce the computational costs of performing the sequence modeling task. For example, the set of all possible output sequences for the sequence modeling task is often far larger than the number of example sequences for the sequence modeling task. By only including data associated with the example sequences for the sequence modeling task and by implicitly representing the remaining possible sequences for the sequence modeling task, the tree model can be used to determine scores for all possible output sequences for the sequence modeling task with significantly reduced memory consumption (e.g., as compared to storing data associated with each possible sequence for the sequence modeling task). As another example, by assigning a same default score feature to each zero-count output sequence, the system can determine scores for the output sequences without performing separate computations for each possible output sequence for the sequence modeling task. In particular, the system can determine the score for a particular extension of an input sequence for the sequence modeling task based on (i) the count features associated with the particular extension within the tree model, (ii) the count features associated with each example extension for the input sequence represented by the tree model, and (iii) the number of all remaining zero-count extensions for the input sequence not explicitly represented by the tree model, which can significantly improve the computational efficiency of performing the sequence modeling task (e.g., as compared to performing separate computations for each possible output sequence for the sequence modeling task).

When the sequence modeling task is an agent control task, the system can determine the scores for output sequences of data elements characterizing actions for the agent based on expected rewards for the actions, as described in more detail below with reference to FIG. 6.

In some cases, the tree model might not include any paths representing extensions of the current sequence of data elements. In some implementations, when the tree model does not include a path representing the current sequence of data elements, the system can be configured to score and select output data elements to extend the current sequence by processing sub-sequences of the current sequence, as described in more detail below with reference to FIG. 4.

The system can select one or more output data elements to extend the current sequence of data elements based on the score distribution for the output data elements (step 306). The system can select the output data elements to extend the current sequence of data elements by any of a variety of methods.

For example, in some implementations, the system can sample the one or more output data elements to extend the current sequence in accordance with the score distribution for the set of possible output data elements. As another example, in some implementations, the system can extend the current sequence of data elements following a greedy optimization technique by, e.g., at each autoregressive iteration, selecting the single output data element, $x_{N+1}$, to extend the current sequence, $x_1 \ldots x_N$, that satisfies:

$$x_N = \arg \max \, s(x'_{N+1} | x_1 \ldots, x_N)$$

As another example, in some implementations, the system can extend the current sequence of data elements following a beam search optimization technique by, e.g., at each autoregressive iteration, selecting the output sequence of data elements, $x_{N+1} \ldots x_{N+L}$, to extend the current sequence $x_1 \ldots x_N$, that satisfies:

$$x_{N+1}, \ldots, x_{N+L} = \arg \max_{X \in \mathcal{P}} L(X | x_1, \ldots, x_N)$$

Where P is a set of possible output sequences having less than a predefined maximum length and L(X) is the length of the possible sequence of output data elements X.

As another example, in some implementations, the system can extend the current sequence of data elements following an exhaustive search optimization technique by, e.g., selecting the output sequence of data elements, $x_{N+1} \ldots x_{N+L}$, to extend the current sequence $x_1 \ldots x_N$, that satisfies:

$$x_{N+1}, \ldots, x_{N+L} = \arg \max_{X \in \mathcal{P}} s(X|x_1, \ldots, x_N)$$

Where P is a set of all possible output sequences.

In some implementations, for each of one or more of the selected output data elements, the system can determine one or more predicted numerical values associated with the output data element (step 308). An example process by which the system can query the tree model to determine the predicted numerical values associated with the output data elements is described in more detail below with reference to FIG. 5.

At each autoregressive iteration, the system can determine whether the generation of the output sequence of data elements is complete (step 310). The system can determine that the generation of the output sequence is complete by any of a variety of methods. For example, the system can determine that the generation of the output sequence is complete after a predetermined number of autoregressive iterations. As another example, the system can determine that the generation of the output sequence is complete when the system generates an output data element indicating an end of the output sequence (e.g., when the system generates an end-of-sequence token as an output data element).

In some implementations, the system can query the tree model to obtain data that characterizes a rationale for how the output sequence of data elements was generated (step 312). For example, as described above with reference to FIG. 2, the tree model can include metadata features that identify how each node and path within the tree model depends on the example sequences used to train the tree model. When the system generates an output sequence of data elements, the system can execute a query on the tree model to obtain the metadata features associated with the nodes and paths in the tree model that were used to generate the output sequence of data elements. The system can output these metadata features as interpretability data that characterizes a rationale for how the output sequence of data elements was generated.

The system can return the generated output sequence of data elements for the sequence modeling task (step 314). For example, the system can provide the output sequence of data elements to a user by means of a user interface (UI) of the system, to an external system by means of an application programming interface (API) of the system, and so on.

In some implementations, the system can return the output sequence of data elements for the sequence modeling task as an output sequence of tokens as generated using the tree model. In other implementations, the system can process the output sequence of tokens generated using the tree model using one or more de-tokenizers for the sequence modeling task to generate output data for the sequence modeling task and can return the output data for the sequence modeling task.

Figure 4:
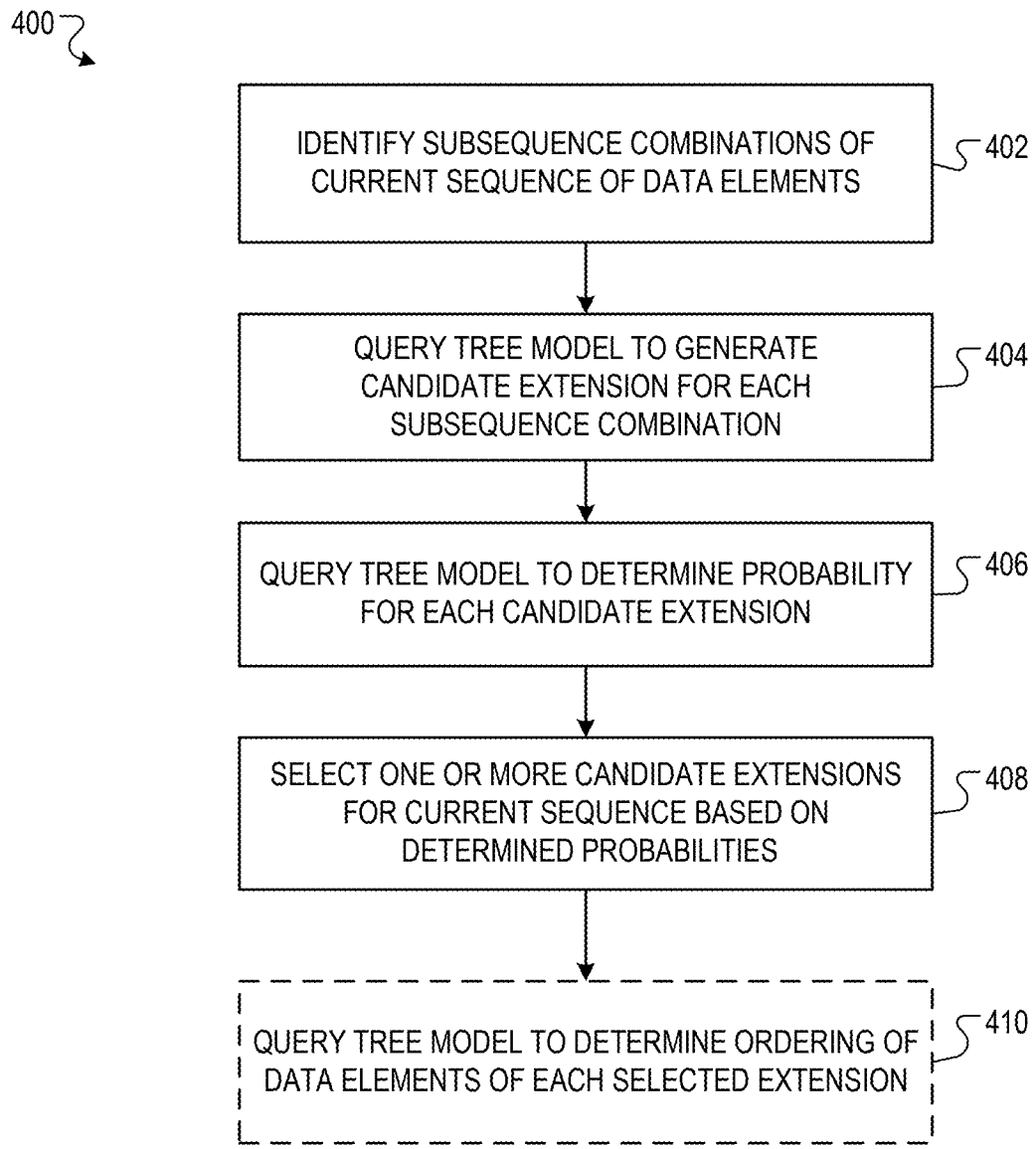
FIG. 4 is a flow diagram of an example process for generating output data elements to extend a current sequence of data elements using a tree model by processing subsequences of the current sequence.

FIG. 4 is a flow diagram of an example process 400 for generating output data elements to extend a current sequence of data elements using a tree model by processing subsequences of the current sequence. For convenience, the process 400 will be described as being performed by a system of one or more computers located in one or more locations. For example, a sequence modeling system, e.g., the sequence modeling system 100 of FIG. 1, appropriately programmed in accordance with this specification, can perform the process 400.

As described above with reference to FIG. 3, the system can perform the process 400 as part of generating an output sequence to extend the current sequence of data elements. For example, in some implementations, the system can perform the process 400 when the system executes a query on the tree model and determines that the tree model does not include any paths that extend the current sequence of data elements (e.g., as part of performing step 304 described above with reference to FIG. 3).

The system can identify one or more subsequence combinations of the current sequence of data elements (step 402). Each subsequence combination can define a partition of the current sequence of data elements into a plurality of contiguous subsequences of data elements. In particular, the system can determine each partition of the current sequence of data elements into a plurality of contiguous subsequences of data elements as a subsequence combination of the current sequence.

As an example, the system can identify the subsequence combinations of the sequence of data elements [A, B, C] to be the partitions:
[[A], [B], [C]]
[[A, B], [C]]
[[A], [B, C]]

The system can execute queries on the tree model to generate, for each of the plurality of subsequence combinations, a respective candidate extension of the current sequence of data elements (step 404). In particular, for each subsequence partition, the system can generate a respective output sequence of data elements for each contiguous subsequence of the subsequence combination using the tree model (e.g., by processing each contiguous subsequence of the combination as an input sequence of data elements following the process 300 described above). For each subsequence combination, the system can concatenate the output sequences generated for each contiguous subsequence of the subsequence combination to generate the candidate extension for the subsequence combination.

The system can execute queries on the tree model to determine a probability of each candidate extension of the current sequence of data elements (step 406). In particular, for each subsequence combination, the system can determine the probability of the candidate extension for the candidate extension for the subsequence combination to be a product of the scores for the output sequences of data elements generated for each of the contiguous subsequences of the subsequence combination (e.g., as determined for each contiguous subsequence following step 304 described above with reference to FIG. 3).

The system can then select one or more of the candidate extensions of the current sequence of data elements based on the probabilities (step 408). The system can select the extensions for the current sequence of data elements by any appropriate method. For example, in some implementations, the system can sample one or more of the candidate extensions in accordance with the probabilities determined for the candidate extensions. As another example, in some implementations, the system can select the one or more candidate extensions that attain a largest probability from among the generated candidate extensions.

In some implementations, for each selected extension of the current sequence of data elements, the system can query the tree model to determine an output ordering of the data elements of the selected extension (step 410). In particular, for each selected extension, the system can query the tree model to determine a respective score for each possible ordering of the output sequences of elements for the selected extension.

As an example, for each ordering σ for a selected extension that maps indices of output elements j as generated at step 406 for the selected extension to re-ordered indices k following k=σ(j), the system can determine the score for the ordering σ following:

$$s(\sigma) = \sum_{j=1}^{N_{out}} \sum_{i=1}^{N_{in}} \sum_{l \in \mathcal{L}(x_i, i; x_j, \sigma(j))} c^l$$

Where $c_l$ is the count feature for a leaf node l of the tree model, $N_{out}$ is the number of output data elements generated for the selected extension of the current sequence of data elements, $N_{in}$ is the number of input data elements in the current sequence, $L(x_i, i; x_j, \sigma(j))$ is the set of all leaf nodes in the tree model for paths in the tree model representing similar sequences of data elements that include both (i) the i-th input data element of the current sequence, $x_i$, in an i-th index of the similar sequences and (ii) the j-th output data element of the selected extension in a σ(j)-th index of the similar sequence.

The system can use the highest scoring ordering for each selected extension of the current sequence as the final output orderings for the selected extensions.

Figure 5:
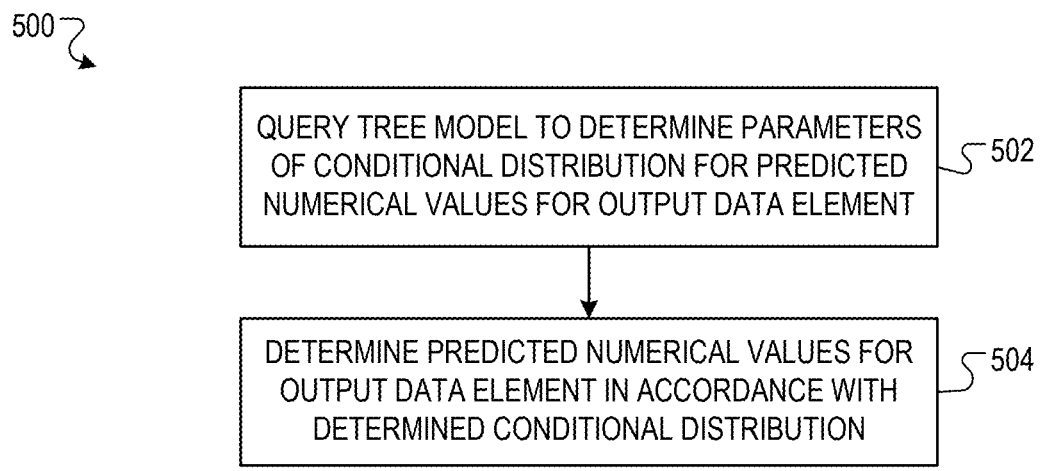
FIG. 5 is a flow diagram of an example process for using a tree model to predict numerical values associated with an output data element for a sequence modeling task.

FIG. 5 is a flow diagram of an example process 500 for using a tree model to predict numerical values associated with an output data element for a sequence modeling task. For convenience, the process 500 will be described as being performed by a system of one or more computers located in one or more locations. For example, a sequence modeling system, e.g., the sequence modeling system 100 of FIG. 1, appropriately programmed in accordance with this specification, can perform the process 500.

The system can query the tree model to determine parameters of a conditional probability distribution of numerical values associated with the output data element (step 502). As described above with reference to FIG. 2, the tree model can include data specifying numerical values associated with the data elements of a set of example sequences for the sequence modeling task. The system can use the stored numerical values for the example sequences for the sequence modeling task to determine joint and conditional distributions of numerical values associated with data elements for the sequence modeling task.

For example, in some implementations, the system can query the tree model to obtain the numerical values stored for occurrences of the output data element and any preceding data elements within the example sequences for the sequence modeling task. The system can then use the store numerical values for the data elements of the example sequences to determine parameters of the conditional distribution for the numerical values associated with the output data element.

As another example, in some implementations, the tree model can store data specifying the conditional distribution for the numerical values of the output data element (e.g., as determined while training the tree model, as described in more detail below with reference to FIG. 7).

As a particular example, the system can query the tree model to determine the parameters (e.g., a mean and a covariance) of a Gaussian conditional distribution for the numerical values of the output data element given the numerical values for any preceding elements. As a further example, the system can determine the parameters of the Gaussian conditional distribution based on, e.g., a mean vector and covariance matrix that define a multi-variate Gaussian joint distribution for the numerical values of the output data element and any preceding elements.

The system can process the numerical values associated with any preceding data elements to determine the predicted numerical values for the output data element using the conditional distribution (step 504). In particular, the system can process the numerical values associated with each input sequence of data elements and with any preceding output data elements, e.g., as previously generated as part of performing the process 300 described above with reference to FIG. 3.

The system can use any appropriate method to determine the predicted numerical values for the output data element. For example, in some implementations, the system can determine the predicted numerical values for the output data element as a mean of the conditional distribution for the numerical values for the output data element as conditioned on the numerical values for the preceding data elements. As another example, in some implementations, the system can sample the predicted numerical values for the output data element from the conditional distribution for the numerical values for the output data element as conditioned on the numerical values for the preceding data elements.

Figure 6:
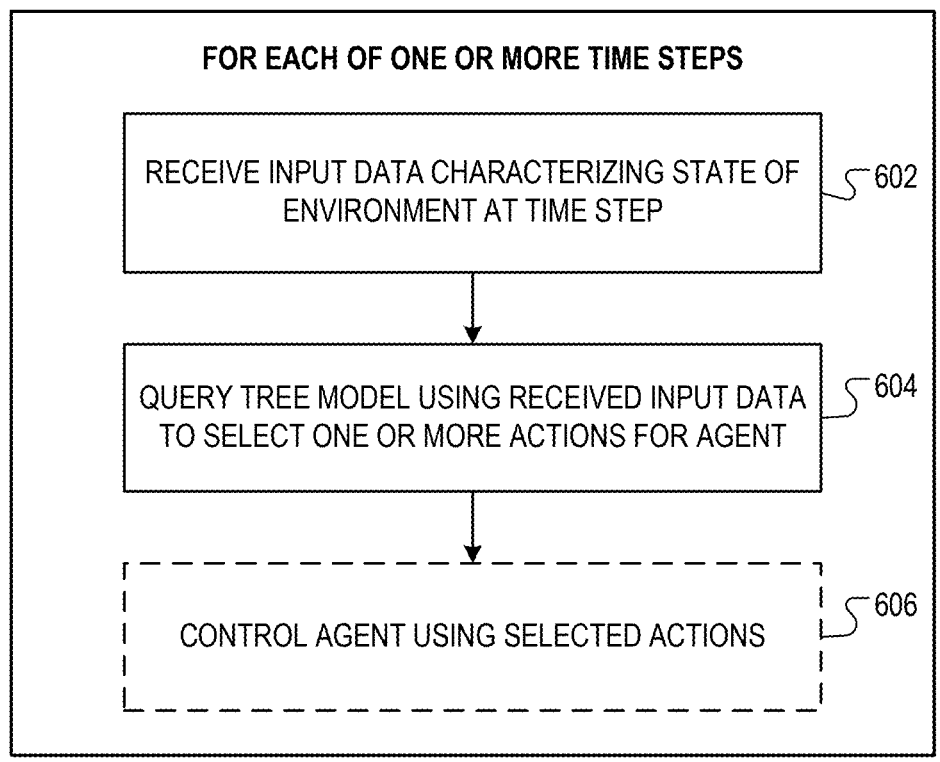
FIG. 6 is a flow diagram of an example process for using a tree model to perform an agent control task.

FIG. 6 is a flow diagram of an example process 600 for using a tree model to perform an agent control task. For convenience, the process 600 will be described as being performed by a system of one or more computers located in one or more locations. For example, a sequence modeling system, e.g., the sequence modeling system 100 of FIG. 1, appropriately programmed in accordance with this specification, can perform the process 600.

The system can perform the agent control task by selecting actions for an agent to perform to interact with an environment over a sequence of time steps for the agent control task. At each time step for the agent control task, the system can perform steps 602 through 606 described below.

The system can receive input data characterizing a state of the environment at the time step (step 602). The system can use the received input data characterizing the state of the environment at the time step to initialize a current sequence of input data elements that characterize the state of the environment at the time step and, optionally, one or more previous states of the environment and one or more previously selected actions for the agent.

The system can query the tree model using the received input data to determine one or more selected actions for the agent (step 604).

As described in more detail below with reference to FIG. 7, the tree model can be trained using example sequences for the agent control task representing example interactions for the agent control task. The index nodes of the tree model for the agent control task can represent state-action pairs for the task that characterize (i) a state of the environment for the agent control task and (ii) a possible action for the agent to perform to interact with the environment. For example, in some implementations, each index node of the tree model can represent a respective state-action pair. As another example, in some implementation, the tree model can include alternating index nodes representing respective states of the environment and actions for the agent. Each path through the tree model can therefore represent a respective trajectory of state-action pairs from example interactions of the agent with the environment. The count feature for the leaf node for a path through the tree model can specify a sequence-action count for the path that characterizes a number of occurrences of the example interaction represented by the path within a set of example interactions used to train the tree model.

Each index node of the tree model representing an action can include data specifying a sequence-action value for the action represented by the node that characterizes, e.g., an expected reward for the agent control task received by performing the action represented by the node. As an example, the sequence-action value for each action can characterize an expected immediate reward received as a result of performing the action. As another example, the sequence-action value for each action can characterize a sum of expected future rewards (e.g., an expected cumulative reward) received as a result of performing the action.

The current sequence of input data elements for the time step can therefore represent a trajectory of state-action pairs performed by the agent to interact the environment prior to the time step. The system can process the current sequence of input data elements using the tree model following the process 300 described above with reference to FIG. 3 to generate an output sequence of data elements characterizing one or more selected actions for the agent.

In particular, by scoring output state-action pairs using a score that depends on the sequence-action values for the state-action pairs as part of performing the process 300, the system can select actions for the agent to perform that optimize an expected reward for the agent control task.

For example, given a current sequence of preceding state-action pairs, $a_1 \ldots a_N$, the system can determine the score for a state-action pair, $a_{N+1}$, representing a possible action for the time step following:

$$s(a_{N+1}|a_1 \ldots a_N) = V(a_{N+1}) \frac{\sum_{l \in \mathcal{L}(a_1 \ldots a_N, a_{N+1})} c_l}{\sum_{a_j \in \mathcal{P}} \sum_{l \in \mathcal{L}(a_1 \ldots a_N, a_j)} c_l}$$

Where $V(a_{N+1})$ is the sequence-action value (e.g., expected reward) for performing the action of the state action pair $a_{N+1}$, $c_L$ is the count feature for a leaf node l of the tree model, $L(a_1 \ldots a_N, a_{N+1})$ is the set of all leaf nodes in the tree model that are descendent from a path in the tree model that extends the current sequence of state-action pairs $a_1 \ldots a_N$ by the state-action pair $a_{N+1}$, P is the set of possible state-action pairs for the time step, and $L(a_1 \ldots a_N, a_j)$ is the set of all leaf nodes in the tree model that are descendent from a path in the tree model that extends the current sequence of state-action pairs $a_1 \ldots a_N$ by the possible state-action pair $a_j$.

As another example, given a sequence of preceding state-action pairs, $a_1 \ldots a_N$, the system can determine the score for a state-action pair, $a_{N+1}$, representing a possible action for the time step following:

$$s(a_{N+1}|a_1 \ldots a_N) = V(a_{N+1}) \frac{\sum_{l \in \mathcal{L}(a_1 \ldots a_N, a_{N+1})} e^{c_l}}{\sum_{a_j \in \mathcal{P}} \sum_{l \in \mathcal{L}(a_1 \ldots a_N, a_j)} e^{c_l}}$$

As another example, given a sequence of preceding state-action pairs, $a_1 \ldots a_N$, the system can determine the score for a state-action pair, $a_{N+1}$, representing a possible action for the time step following:

$$s(a_{N+1}|a_1 \ldots a_N) = V(a_{N+1}) \frac{e^{\sum_{l \in \mathcal{L}(a_1 \ldots a_N, a_{N+1})} c_l}}{\sum_{a_j \in \mathcal{P}} e^{\sum_{l \in \mathcal{L}(a_1 \ldots a_N, a_j)} c_l}}$$

As part of performing the process 300, the system can therefore select actions for the agent to perform in accordance with the score distribution over the set of possible actions defined by the scores for the possible state-action pairs. For example, in some implementations, the system can select the action having the highest score under the score distribution over the set of possible actions. As another example, the system can select the action by stochastically sampling the action from the score distribution over the set of possible actions.

In some implementations, the system can control the agent using the selected action (step 606). For example, the system can provide data characterizing the selected actions to the agent or to a control system of the agent.

Figure 7:
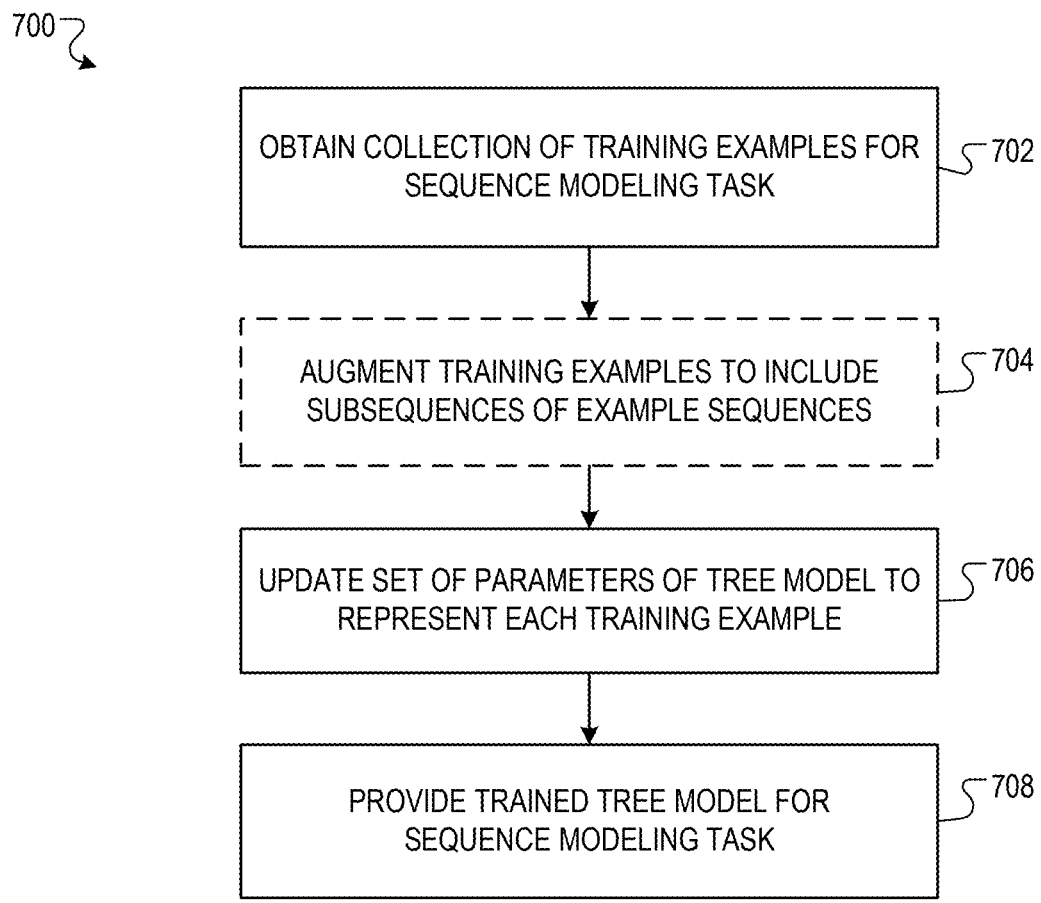
FIG. 7 is a flow diagram of an example process for training a tree model to perform a sequence modeling task.

FIG. 7 is a flow diagram of an example process 700 for training a tree model to perform a sequence modeling task. For convenience, the process 700 will be described as being performed by a system of one or more computers located in one or more locations. For example, a training system, e.g., the training system 100 of FIG. 1, appropriately programmed in accordance with this specification, can perform the process 700.

The system can obtain a collection of training examples for the sequence modeling task (step 702). As described above with reference to FIG. 1, each training example can include an example sequence of data elements. In some implementations, each training example can include data characterizing numerical values (e.g., scalar values, vector data, matrix data, multi-dimensional array data, etc.) associated with one or more data elements of the example sequence for the training example.

The collection of training examples can include any appropriate number of example sequences for the sequence modeling task, e.g., at least 1,000 example sequences, at least 10,000 example sequences, at least 100,000 example sequences, at least one million example sequences, at least one billion example sequences, and so on.

In some implementations, the system can augment the collection of training examples to include subsequences of the example sequences for the sequence modeling task (step 704). For example, the system can preprocess the collection of training examples by processing each training example to identify a plurality of subsequences of data elements from the example sequence of data elements of the training example and update the collection of training examples to include new training examples corresponding to the plurality of identified subsequences of data elements for the training example. As a further example, in some implementations, the system can preprocess the collection of training examples to identify and include all subsequences of the training examples that have a length between a predefined minimum and maximum length.

The system can process each training example to update a set of parameters of the tree model to represent the training example (step 706). In particular, the system can update the set of parameters of the tree model to explicitly represent each training example of the collection of training examples for the sequence modeling task.

As part of training the tree model, the system can update the tree model to include a respective path of nodes (e.g., index nodes) representing the example sequence of data elements for each training example. The system can associate each path of nodes representing an example sequence with a count feature that represents a number of times the example sequence of data elements occurs within the collection of training examples for the sequence modeling task. In particular, as described above with reference to FIG. 2, the system can update the tree model to include a respective leaf node for each path of nodes representing an example sequence that includes the count feature for the example sequence.

To update the tree model to represent a training example, the system can query the tree model to determine whether the tree model includes paths representing the example sequence of data elements for the training example or any prefixes of the example sequence of data elements for the training example. If the system determines that a path representing the sequence of data elements of the training example currently exists in the tree model, the system can, in response, increment the count feature associated with the path representing the sequence of data elements of the training example. Alternatively, if the system determines that a path representing a prefix of the sequence of data elements of the training example currently exists in the tree model, the system can, in response, branch the path representing the prefix of the sequence of data elements to represent a corresponding suffix of the sequence of data elements of the training example by, e.g., including a connected path of nodes representing the suffix within the tree model that is connected to the path of nodes representing the prefix. Alternatively, if the system determines that no path in the tree model represents any prefix of the sequence of data elements of the training example, the system can, in response, add a new connected path of nodes to the tree model to represent the sequence of data elements of the training example.

In some implementations, when a training example includes numerical values associated with one or more data elements of the example sequence for the training example, the system can update the tree model to represent the numerical values associated with the data elements of the training example. For example, the system can update index nodes of the tree model representing data elements of the training example to include the numerical values associated with the data elements of the training example. As another example, the system can update a leaf node for the path representing the training example to include the numerical values associated with the data elements of the training example. As another example, when each index node of the tree model includes data characterizing the count features of all leaf nodes descendent from the index node in the tree model, the system can update (e.g., increment) the count feature data included within the index nodes of the tree model representing data elements of the training example.

In some implementations, the system can update the tree model to include parameters defining a joint probability distribution of the numerical values associated with the data elements of the example sequences. For example, for each sequence of data elements represented by the tree model, the system can determine parameters (e.g., a mean vector and a covariance matrix) defining a multi-variate Gaussian distribution for the numerical values associated with the data elements and can associate the parameters defining the distribution with the path representing the sequence of data elements (e.g., within a leaf node for the path).

When the sequence modeling task is an agent control task, each training example can define a trajectory representing interaction of the agent with the environment over a sequence of time steps. For an agent control task, each data element for a training example can correspond to a respective time step and can include data defining: (i) a state of the environment at the time step, (ii) an action performed by the agent at the time step, and (iii) a reward received by the agent at the time step. The system can update the tree model to include paths of nodes representing trajectories of example state-action pairs for the agent control task.

While updating the tree model to represent an example interaction for the agent control task, the system can update a sequence-action value associated with each state-action pair for the example interaction. For example, in some implementations, the system can determine the sequence-action value for each state-action pair as a running average of the reward received by the agent by performing the action of the state-action pair. As another example, the system can determine the sequence-action value for each state-action pair as a running average of a cumulative measure of rewards received by the agent by performing the action of the state-action pair. As a further example, the system can determine the sequence-action value, $V(a_t)$, for a state-action pair at a t-th time step of an example interaction following:

$$V(a_t) = \mathbb{E}\left[\sum_{k=0}^{\infty} \gamma^k R_{t+k+1}\right]$$

Where $\gamma$ is a reward discount factor and $R_{t+k+1}$ is the reward received at the t+k+1-th time step of an example interaction.

In some implementations, when updating the tree model to represent training examples, the system can update the tree model to associate the path in the tree model representing the example sequence of the training example with one or more interpretability metadata features (e.g., by including the metadata features within index nodes of the path representing the example sequence, within a leaf node for the path representing the example sequence, etc.). Each interpretability metadata feature can include metadata that identifies a respective instance of the example sequence of data elements in the collection of training examples for the sequence modeling task.

In some implementations, the system can train the tree model using a plurality of independent computing units in parallel. For example, the system can distribute training examples from the collection of training examples across the plurality of independent computing units and can use each computing unit to independently update the tree model using the training examples assigned to the computing unit. While each computing units updates the tree model to represent an assigned training example, the computing unit can enforce record level locks that prevent other computing units from updating any parameters associated with the data elements of the assigned training data.

A computing unit may be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs.

The system can provide the trained tree model (step 708). After training, the system can use the trained tree model to perform the sequence modeling task, e.g., following the process 300 described above with reference to FIG. 3.

FIG. 8 illustrates experimental results demonstrating performance of the methods described in this specification on an example sequence modeling task.

In particular, FIG. 8 illustrates experimental results comparing a performance of implementation of the described systems and a conventional Transformer based neural network for an example sequence modeling task that involves translating English text to corresponding Spanish text.

As illustrated in FIG. 8, the described systems only required 241 seconds of data preprocessing and 64 seconds of training for the example task. In contrast, the conventional Transformer neural network required 1.9 hours for a single epoch of training and 57.2 hours for 30 epochs of training for the example task.

Despite the far shorter training time, the described systems attained better performance for the example task as measured by a Bilingual Evaluation Understudy (BLEU) score for the task, which is described by Papineni, et al., in "BLEU: A Method for Automatic Evaluation of Machine Translation," *Proceedings of the 40th Annual Meeting of the Association for Computational Linguistics,* 2002. The conventional Transformer neural network, in contrast, was unable to be trained given the resources available, even with far greater time allowed for training.

Estimating energy consumption as being proportional to time-of-compute, the described systems provide a far more energy efficient model that requires 63.7 s/205892 s=0.03% of the energy used to train the conventional Transformer neural network.

The described systems, once trained, included ~5 million parameters to explicitly represent the training data for the example task, in contrast to the Transformer neural network that included roughly four times as many parameters with ~20 million. The vocabulary size of the Transformer neural network was limited so that the Transformer neural network included a comparable number of parameters as the described systems. To increase the vocabulary size of the Transformer neural network to be equivalent to that of the described systems would require increasing the number of parameters in the Transformer neural network by an order of magnitude (e.g., to ~200 million parameters).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a set of training examples, wherein each training example comprises a sequence of data elements;
    training a tree model on the set of training examples, wherein:

the tree model comprises a set of nodes and a set of edges, wherein each node is associated with a respective data element, and wherein each edge connects a respective pair of nodes;

wherein the tree model comprises a plurality of paths from a root node of the tree model to a leaf node of the tree model that each represent a respective sequence of data elements from the set of training examples;

wherein training the tree model comprises associating each path in the tree model that represents a sequence of data elements with a count feature that represents a number of times the sequences of data elements occurs in the set of training examples;

wherein the training of the tree model is performed substantially in parallel by a plurality of independent computing units; and performing a sequence modeling task using the trained tree model, wherein the sequence modeling task comprises:

receiving an input sequence of data elements; and processing the input sequence of data elements to generate an output sequence of data elements, comprising:

initializing a current sequence of data elements as the input sequence of data elements;

iteratively extending the current sequence of data elements over a plurality of iterations, comprising, at each of one or more iterations:

executing a query on the tree model to determine a score distribution over a set of possible data elements, wherein the score for each target data element is based on a count feature for a path in the tree model that represents a sequence of data elements that extends the current sequence of data elements by the target data element; and selecting one or more data elements to extend the current sequence of data elements based on the score distribution.

2. The method of claim 1, wherein the tree model explicitly represents the sequence of data elements from every training example in the set of training examples.

3. The method of claim 1, wherein training the tree model on the set of training examples comprises, for one or more training examples:

determining that a path representing the sequence of data elements of the training example currently exists in the tree model; and in response, incrementing the count feature associated with the path representing the sequence of data elements of the training example.

4. The method of claim 1, wherein training the tree model on the set of training examples comprises, for one or more training examples:

determining that a path representing a prefix of the sequence of data elements of the training example currently exists in the tree model; and in response, branching the path representing the prefix of the sequence of data elements to represent a suffix of the sequence of data elements of the training example.

5. The method of claim 1, wherein training the tree model on the set of training examples comprises, for one or more training examples:

determining that no path in the tree model represents any prefix of the sequence of data elements of the training example; and in response, adding a new path comprising a sequence of nodes and edges to the tree model to represent the sequence of data elements of the training example.

6. The method of claim 1, wherein training the tree model substantially in parallel by the plurality of computing units comprises:

distributing the training examples from the set of training examples across the plurality of independent computing units;

wherein each computing unit independently updates the tree model based on each training example in a set of training examples that are assigned to the computing unit.

7. The method of claim 1, wherein training the tree model on the set of training examples further comprises:

associating each path in the tree model that represents a sequence of data elements with one or more metadata features, wherein each metadata feature comprises metadata for an instance of the sequence of data elements in the set of training examples.

8. The method of claim 1, wherein obtaining the set of training examples comprises preprocessing the set of training example, including, for each training example:

identifying a plurality of subsequences of data elements from the sequence of data elements of the training example; and augmenting the set of training examples to include new training examples corresponding to the plurality of subsequences of data elements.

9. The method of claim 8, wherein identifying the plurality of subsequences of data elements from the sequence of data elements comprises:

identifying all subsequences having a length that is between a predefined minimum and maximum length.

10. The method of claim 1, wherein the set of training examples comprises at least 100,000 training examples.

11. The method of claim 1, wherein iteratively extending the current sequence of data elements over the plurality of iterations further comprises, at each of one or more iterations:

executing a query on the tree model to determine that the tree model does not include any paths that extend the current sequence of data elements; and in response, identifying a plurality of subsequence combinations of the current sequence of data elements, wherein each subsequence combination defines a partition of the current sequence of data elements into a plurality of contiguous subsequences of data elements;

executing queries on the tree model to generate, for each of the plurality of subsequence combinations, a respective candidate extension of the current sequence of data elements;

executing queries on the tree model to determine a probability of each candidate extension of the current sequence of data elements; and selecting one or more of the candidate extensions of the current sequence of data elements based on the probabilities.

12. The method of claim 1, wherein the current sequence of data elements is iteratively extended by a beam search optimization technique.

13. The method of claim 1, wherein the current sequence of data elements is iteratively extended by a greedy optimization technique.

14. The method of claim 1, wherein the current sequence of data elements is iteratively extended by an exhaustive search optimization technique.

15. A system comprising:
one or more computers; and
one or more storage devices communicatively coupled to the one or more computers, wherein the one or more storage devices store instructions that, when executed by the one or more computers, cause the one or more computers to perform operations comprising:
obtaining a set of training examples, wherein each training example comprises a sequence of data elements;
training a tree model on the set of training examples, wherein:
the tree model comprises a set of nodes and a set of edges, wherein each node is associated with a respective data element, and wherein each edge connects a respective pair of nodes;
wherein the tree model comprises a plurality of paths from a root node of the tree model to a leaf node of the tree model that each represent a respective sequence of data elements from the set of training examples;
wherein training the tree model comprises associating each path in the tree model that represents a sequence of data elements with a count feature that represents a number of times the sequences of data elements occurs in the set of training examples;
wherein the training of the tree model is performed substantially in parallel by a plurality of independent computing units; and
performing a sequence modeling task using the trained tree model, wherein the sequence modeling task comprises:
receiving an input sequence of data elements; and
processing the input sequence of data elements to generate an output sequence of data elements, comprising:
initializing a current sequence of data elements as the input sequence of data elements;
iteratively extending the current sequence of data elements over a plurality of iterations, comprising, at each of one or more iterations:
executing a query on the tree model to determine a score distribution over a set of possible data elements, wherein the score for each target data element is based on a count feature for a path in the tree model that represents a sequence of data elements that extends the current sequence of data elements by the target data element; and
selecting one or more data elements to extend the current sequence of data elements based on the score distribution.

16. One or more non-transitory computer storage media storing instructions that when executed by one or more computers cause the one or more computers to perform operations comprising:
obtaining a set of training examples, wherein each training example comprises a sequence of data elements;
training a tree model on the set of training examples, wherein:
the tree model comprises a set of nodes and a set of edges, wherein each node is associated with a respective data element, and wherein each edge connects a respective pair of nodes;
wherein the tree model comprises a plurality of paths from a root node of the tree model to a leaf node of the tree model that each represent a respective sequence of data elements from the set of training examples;
wherein training the tree model comprises associating each path in the tree model that represents a sequence of data elements with a count feature that represents a number of times the sequences of data elements occurs in the set of training examples;
wherein the training of the tree model is performed substantially in parallel by a plurality of independent computing units; and
performing a sequence modeling task using the trained tree model, wherein the sequence modeling task comprises:
receiving an input sequence of data elements; and
processing the input sequence of data elements to generate an output sequence of data elements, comprising:
initializing a current sequence of data elements as the input sequence of data elements;
iteratively extending the current sequence of data elements over a plurality of iterations, comprising, at each of one or more iterations:
executing a query on the tree model to determine a score distribution over a set of possible data elements, wherein the score for each target data element is based on a count feature for a path in the tree model that represents a sequence of data elements that extends the current sequence of data elements by the target data element; and
selecting one or more data elements to extend the current sequence of data elements based on the score distribution.

17. The non-transitory computer storage media of claim 16, wherein the tree model explicitly represents the sequence of data elements from every training example in the set of training examples.

18. The non-transitory computer storage media of claim 16, wherein training the tree model on the set of training examples comprises, for one or more training examples:
determining that a path representing the sequence of data elements of the training example currently exists in the tree model; and
in response, incrementing the count feature associated with the path representing the sequence of data elements of the training example.

19. The non-transitory computer storage media of claim 16, wherein training the tree model on the set of training examples comprises, for one or more training examples:
determining that a path representing a prefix of the sequence of data elements of the training example currently exists in the tree model; and
in response, branching the path representing the prefix of the sequence of data elements to represent a suffix of the sequence of data elements of the training example.

20. The non-transitory computer storage media of claim 16, wherein training the tree model on the set of training examples comprises, for one or more training examples:
determining that no path in the tree model represents any prefix of the sequence of data elements of the training example; and
in response, adding a new path comprising a sequence of nodes and edges to the tree model to represent the sequence of data elements of the training example.

* * * * *